US008582948B2

(12) United States Patent
Ishii et al.

(10) Patent No.: US 8,582,948 B2
(45) Date of Patent: Nov. 12, 2013

(54) SCENARIO EDITING APPARATUS AND SCENARIO EDITING METHOD, IMAGE CAPTURING APPARATUS AND CONTROL METHOD THEREOF, AND SCENARIO EDITING SYSTEM

(75) Inventors: Yoshiki Ishii, Yokohama (JP); Yasushi Kachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/409,719

(22) Filed: Mar. 1, 2012

(65) Prior Publication Data

US 2012/0237178 A1 Sep. 20, 2012

(30) Foreign Application Priority Data

Mar. 17, 2011 (JP) ................................ 2011-059654

(51) Int. Cl.

| | |
|---|---|
| ***H04N 5/77*** | (2006.01) |
| ***H04N 9/80*** | (2006.01) |
| *G11B 27/00* | (2006.01) |
| *H04N 5/93* | (2006.01) |

(52) U.S. Cl.
USPC ........... 386/228; 386/229; 386/239; 386/241; 386/248; 386/278; 386/280; 386/288

(58) Field of Classification Search
USPC ......... 386/228, 229, 239, 241, 248, 278, 280, 386/288
See application file for complete search history.

(56) References Cited

U.S. PATENT DOCUMENTS

| | | | | |
|---|---|---|---|---|
| 6,741,977 | B1 * | 5/2004 | Nagaya et al. | 1/1 |
| 2002/0191952 | A1 * | 12/2002 | Fiore et al. | 386/46 |
| 2010/0259373 | A1 * | 10/2010 | Chang | 340/438 |

FOREIGN PATENT DOCUMENTS

| | | |
|---|---|---|
| JP | 63-276651 | 11/1988 |
| JP | 2004-187275 A | 7/2004 |

* cited by examiner

*Primary Examiner* — Daquan Zhao
(74) *Attorney, Agent, or Firm* — Cowan, Liebowitz & Latman, P.C.

(57) ABSTRACT

A scenario editing apparatus which generates and edits scenario data to be referred at an image capturing, comprises: a first recording unit which records first scenario data appended with identification numbers for respective captured contents; a read-out unit which reads out image data captured with reference to the first scenario data and identification numbers for the respective captured contents; a selection unit which selects image data to be re-captured; a generation unit which generates second scenario data to be re-captured while reproducing the selected image data; and a second recording unit which records the generated second scenario data.

10 Claims, 26 Drawing Sheets

FIRST RECORDING AREA

"SCENARIO 1"
SCENARIO TYPE: 1
SCENARIO IDENTIFICATION NUMBER: SCENE NUMBER/CUT NUMBER
SCENARIO DATA: CONTENTS
"SCENARIO 2"
• • •

FIRST RECORDING AREA

"SCENARIO 1"
SCENARIO TYPE: 2
SCENARIO IDENTIFICATION NUMBER: SCENE NUMBER/CUT NUMBER
SCENARIO DATA: TITLE
CONTENTS
TAKE START NUMBER
IMAGE CAPTURING INSTRUCTION INFORMATION
REFERENCE IMAGE DATA

"SCENARIO 2"
• • •

FIG. 24A

| TYPE | SCENE NUMBER | CUT NUMBER | TAKE NUMBER | START TIME | END TIME |
|---|---|---|---|---|---|
| IMAGE (Cm-2) TWO IMAGES BEFORE IMAGE TO BE RE-CAPTURED | 3 | 7 | 3 | 00' 00" | 00' 09" |
| IMAGE (Cm-1) BEFORE IMAGE TO BE RE-CAPTURED | 3 | 8 | 5 | 00' 00" | 00' 02" |
| IMAGE (Cm) TO BE RE-CAPTURED | 3 | 9 | 2 | 00' 00" | 00' 13" |
| IMAGE (Cm+1) AFTER IMAGE TO BE RE-CAPTURED | 3 | 10 | 2 | 00' 00" | 00' 12" |

FIG. 24B

| TYPE | SCENE NUMBER | CUT NUMBER | TAKE NUMBER | START TIME | END TIME |
|---|---|---|---|---|---|
| IMAGE (Cn-1) BEFORE IMAGE TO BE RE-CAPTURED | 5 | 1 | 6 | 00' 18" | 00' 38" |
| IMAGE (Cn) TO BE RE-CAPTURED | 5 | 2 | 2 | 00' 00" | 00' 11" |
| IMAGE (Cn+1) AFTER IMAGE TO BE RE-CAPTURED | 5 | 3 | 4 | 00' 00" | 00' 12" |

FIG. 26

| TYPE | SCENE NUMBER | CUT NUMBER | TAKE NUMBER | START TIME | END TIME |
|---|---|---|---|---|---|
| IMAGE (C1) BEFORE IMAGE TO BE RE-CAPTURED | 10 | 1 | 4 | 00' 00" | 00' 14" |
| IMAGE (C2) TO BE RE-CAPTURED | 10 | 2 | 2 | 00' 00" | 00' 16" |
| IMAGE (C3) AFTER IMAGE TO BE RE-CAPTURED | 10 | 3 | 3 | 00' 00" | 00' 21" |

SCENARIO EDITING APPARATUS AND SCENARIO EDITING METHOD, IMAGE CAPTURING APPARATUS AND CONTROL METHOD THEREOF, AND SCENARIO EDITING SYSTEM

BACKGROUND OF THE INVENTION

1. Field of the Invention

The present invention relates to a scenario editing apparatus and scenario editing method, image capturing apparatus and control method thereof, and scenario editing system, particularly relates to a scenario data editing technique that facilitates a re-capturing operation.

2. Description of the Related Art

In recent years, video cameras, which record captured images as digital data files, have appeared, thus facilitating image capturing and editing operations. In such image capturing and editing systems, it is important to append metadata for adequately classifying image data, and image data are easily identified using metadata recorded together with the image data, thus improving efficiency of management and editing.

On the other hand, at a movie or drama production site, it is a common practice to capture images along a scenario (plot), which is prepared in advance, and to edit images by fitting them to the scenario. In this manner, image capturing assistant data corresponding to the scenario are generated in advance, and images are captured by selecting the scenario by a video camera, thus automatically generating metadata associated with the scenario. Thus, the efficiency of management and editing of images after the image capturing operation can be further improved.

For example, Japanese Patent Laid-Open No. 2004-187275 discloses a scenario editing system and image capturing support and take metadata cooperation processes by that system.

However, in Japanese Patent Laid-Open No. 2004-187275, preparation of a scenario and an image capturing operation with reference to the scenario can improve efficiency of processing until the image capturing operation, but no means for feeding back the image capturing result to the next image capturing operation is provided. That is, when a user is not satisfied with the image capturing result and wants to capture images again, he or she has to re-capture all images with reference to the same scenario in place of a re-capturing operation of only a dissatisfied part.

SUMMARY OF THE INVENTION

The present invention has been made in consideration of the aforementioned problems, and realizes a scenario editing technique which can reflect an image capturing result to the next image capturing operation, and can improve efficiencies of image capturing and editing operations when images are to be captured with reference to scenario data.

In order to solve the aforementioned problems, the present invention provides a scenario editing apparatus which generates and edits scenario data to be referred to when an image capturing apparatus captures images, comprising: a first recording unit configured to record first scenario data appended with identification numbers for respective captured contents in a recording medium; a read-out unit configured to read out image data captured with reference to the first scenario data and identification numbers for the respective captured contents, which are associated with the captured image data, from the recording medium; a selection unit configured to select image data, which is to be instructed to be re-captured, from the captured image data read out by the read-out unit; a generation unit configured to generate second scenario data to be re-captured by receiving an input image capturing instruction while reproducing the image data selected by the selection unit; and a second recording unit configured to record the second scenario data generated by the generation unit in the recording medium.

In order to solve the aforementioned problems, the present invention provides an image capturing apparatus which captures images with reference to scenario data appended with identification numbers for respective captured contents, comprising: an image capturing unit configured to capture images with reference to scenario data recorded in a first recording area of a recording medium; a recording unit configured to record the image data captured with reference to the scenario data and the identification numbers for the respective captured contents associated with the captured image data in a second recording area of the recording medium in association with each other; a display unit configured to display images related to the captured image data and information related to the scenario data; and a determination unit configured to determine whether or not the scenario data is scenario data to be re-captured, wherein when the determination unit determines that the scenario data is scenario data to be re-captured, the display unit displays a reference image for a re-capturing operation, which image is generated from the captured image data, together with the images related to the captured image data.

In order to solve the aforementioned problems, the present invention provides a scenario editing apparatus which generates and edits scenario data to be referred to when an image capturing apparatus captures images, comprising: an obtaining unit configured to obtain image data captured by the image capturing apparatus; a display unit configured to display images related to the image data obtained by the obtaining unit; a designation unit configured to designate a first image required to be re-captured from the images displayed by the display unit; a specifying unit configured to specify a second image having a high correlation with the first image designated by the designation unit; a generation unit configured to generate scenario data to be re-captured, which includes the first image designated by the designation unit and the second image specified by the specifying unit; and a recording unit configured to record the scenario data to be re-captured, which is generated by the generation unit.

In order to solve the aforementioned problems, the present invention provides a scenario editing system established by a scenario editing apparatus which generates and edits scenario data to be referred to when an image capturing apparatus captures images, and an image capturing apparatus which captures images with reference to the scenario data, the scenario editing apparatus comprising: a first recording unit configured to record first scenario data appended with identification numbers for respective captured contents in a recording medium; a read-out unit configured to read out image data captured with reference to the first scenario data and identification numbers for the respective captured contents, which are associated with the captured image data, from the recording medium; a selection unit configured to select image data, which is to be instructed to be re-captured, from the captured image data read out by the read-out unit; a generation unit configured to generate second scenario data to be re-captured by accepting an input image capturing instruction while reproducing the image data selected by the selection unit; and a second recording unit configured to record the second scenario data generated by the generation unit in the recording medium, the image capturing apparatus comprising: an image capturing unit configured to capture image with reference to scenario data recorded in a first recording area of the recording medium; a recording unit configured to record the image data captured with reference to the scenario data and the identification numbers for the respective captured contents associated with the captured image data in a second recording area of the recording medium in association with each other; a display unit configured to display images related to the captured image data and information related to the scenario data; and a determination unit configured to determine whether or not the scenario data is scenario data to be re-captured, wherein when the determination unit determines that the scenario data is scenario data to be re-captured, the display unit displays a reference image for a re-capturing operation, which image is generated from the captured image data, together with the images related to the captured image data.

In order to solve the aforementioned problems, the present invention provides a scenario editing method for an apparatus which generates and edits scenario data to be referred to when an image capturing apparatus captures images, the method comprising: a first recording step of recording first scenario data appended with identification numbers for respective captured contents in a recording medium; a read-out step of reading out image data captured with reference to the first scenario data and identification numbers for the respective captured contents, which are associated with the captured image data, from the recording medium; a selection step of selecting image data, which is to be instructed to be re-captured, from the captured image data read out in the read-out step; a generation step of generating second scenario data to be re-captured by accepting an input image capturing instruction while reproducing the image data selected in the selection step; and a second recording step of recording the second scenario data generated in the generation step in the recording medium.

In order to solve the aforementioned problems, the present invention provides a control method for an image capturing apparatus which captures images with reference to scenario data appended with identification numbers for respective captured contents, the method comprising: an image capturing step of capturing image with reference to scenario data recorded in a first recording area of a recording medium; a recording step of recording the image data captured with reference to the scenario data and the identification numbers for the respective captured contents associated with the captured image data in a second recording area of the recording medium in association with each other; a display step of displaying, on a display unit, images related to the captured image data and information related to the scenario data; and a determination step of determining whether or not the scenario data is scenario data to be re-captured, wherein when it is determined in the determination step that the scenario data is scenario data to be re-captured, a reference image for a re-capturing operation, which image is generated from the captured image data, is displayed in the display step together with the images related to the captured image data.

In order to solve the aforementioned problems, the present invention provides a scenario editing method for an apparatus which generates and edits scenario data to be referred to when an image capturing apparatus captures images, the method comprising: an obtaining step of obtaining image data captured by the image capturing apparatus; a display step of displaying, on a display unit, images related to the image data obtained in the obtaining step; a designation step of designating a first image required to be re-captured from the images displayed on the display unit; a specifying step of specifying a second image having a high correlation with the first image designated in the designation step; a generation step of generating scenario data to be re-captured, which includes the first image designated in the designation step and the second image specified in the specifying step; and a recording step of recording, in a recording medium, the scenario data to be re-captured, which is generated in the generation step.

According to the present invention, when images are to be captured with reference to scenario data, second scenario data including captured images is generated to allow to easily re-capture images while referring to reference image data by an image capturing apparatus.

Further features of the present invention will become apparent from the following description of exemplary embodiments (with reference to the attached drawings).

BRIEF DESCRIPTION OF THE DRAWINGS

FIGS. 11A and 11B are views showing the configurations of scenario data;

FIGS. 24A and 24B are tables showing examples of scenario data to be re-captured, which is generated according to the third embodiment;

FIG. 26 is a table showing scenario data to be re-captured, which is generated according to the fourth embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

This embodiment will exemplify a case in which a scenario editing apparatus of the present invention is implemented by a personal computer (to be referred to as a PC hereinafter), an image capturing apparatus is implemented by a digital video camera, and a scenario editing system is implemented by these PC and digital video camera. Note that the image capturing apparatus includes an apparatus having a function of generating image data by capturing an image by photo-electrically converting light coming from an object in addition to a digital still camera, digital video camera, and the like. In this embodiment, assume that an image mainly represents moving image (video) data.

<Internal Arrangement of PC>

A schematic arrangement of the PC which implements the scenario editing apparatus of the present invention will be described first with reference to FIG. 1.

Figure 1:
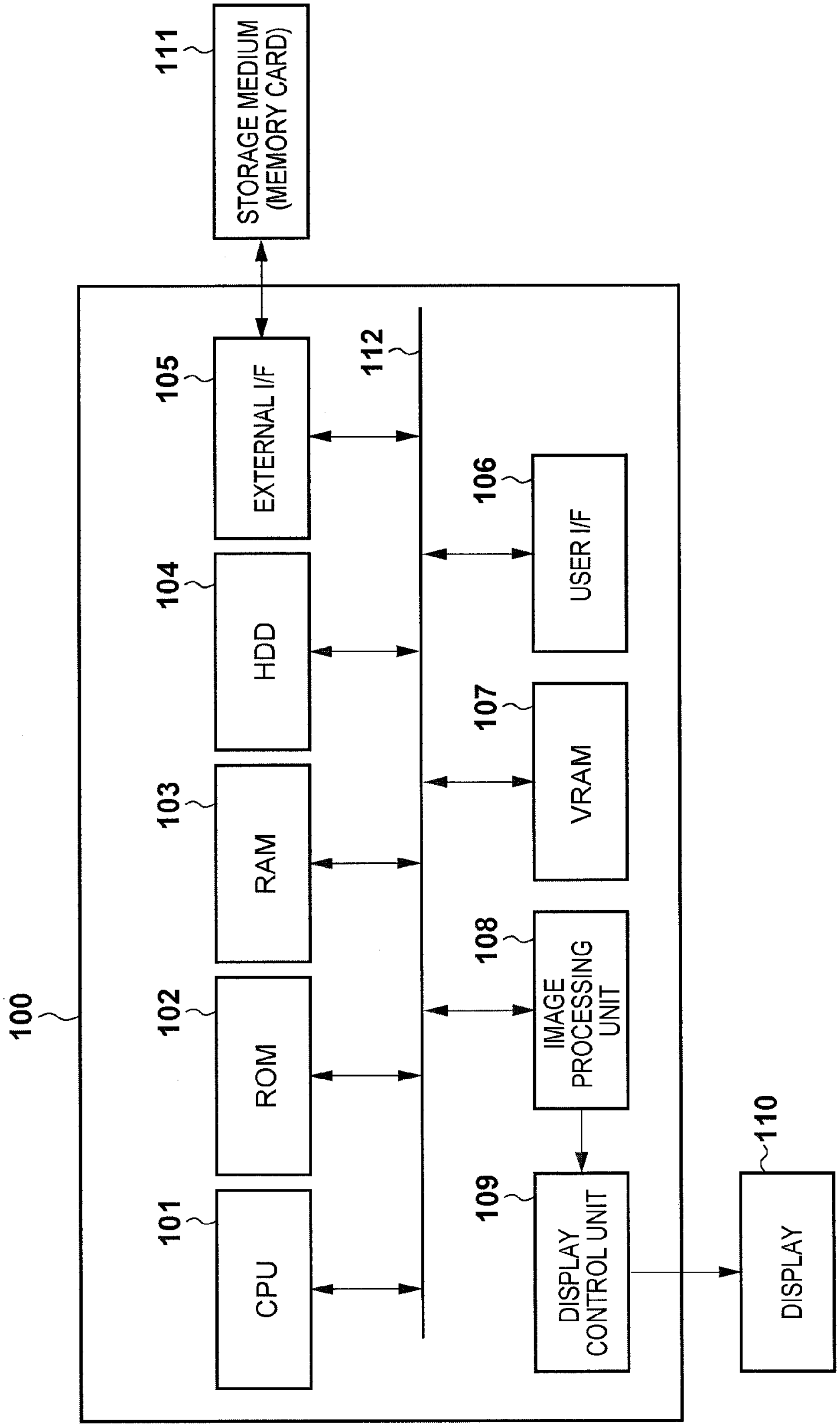
FIG. 1 is a block diagram showing the principal internal arrangement of a PC according to an embodiment of the present invention.

FIG. 1 is a block diagram showing the principal internal arrangement of a PC 100.

Referring to FIG. 1, reference numeral 101 denotes a CPU which controls the overall PC 100. The CPU 101 controls respective units to be described below according to user operations.

Reference numeral 102 denotes a ROM used to store programs for controlling the PC 100, and data used by the programs. The ROM 102 includes a program for editing scenario data to be described later as the first and second embodiments, and an associated image specifying program, a time axis allocation program, a trimming program, and the like to be described later as the third and fourth embodiments.

Reference numeral 103 denotes a rewritable memory (RAM) used as a work area by the programs which control the PC 100.

Reference numeral 104 denotes a hard disk (HDD) used to record various data used by the PC 100.

Reference numeral 105 denotes an external I/F (interface) provided for reading out data recorded in an external storage medium 111 or write data in that medium in accordance with an instruction from the CPU 101. The external I/F 105 has a memory card slot, and controls data read/write accesses to the external storage medium 111. As the storage medium 111, for example, memory cards such as a CF® card and SDHC® card, which are detachable from the PC 100 via the external I/F 105, are used.

Reference numeral 106 denotes a user I/F provided for notifying the PC 100 of a user operation. The user I/F 106 is configured by, for example, a keyboard, mouse, and the like.

Reference numeral 107 denotes a VRAM used as a buffer until a screen rendered by an image processing unit 108 (to be described below) is scanned.

Reference numeral 108 denotes an image processing unit, which receives coordinates of image data to be rendered on a screen from the CPU 101, calculates display positions of dots on an image, and temporarily stores that information in the VRAM 107. The image processing unit 108 reads out data in the VRAM 107 at a predetermined timing, and transfers the readout data to a display control unit 109.

Reference numeral 109 denotes a display control unit which converts image data held in the VRAM 107 into a digital signal which can be displayed by a display 110, and transfers the digital signal to the display 110.

The display 110 such as an LCD displays image data output from the display control unit 109.

Reference numeral 112 denotes a transmission path provided for transferring control signals or data signals of the respective units.

[First Embodiment]

The arrangement of the scenario editing apparatus of this embodiment will be described below with reference to FIG. 2.

A scenario editing apparatus 200 of this embodiment inputs scenario data, which represents contents to be captured, in advance, and saves the scenario data in the storage medium 111 used to provide the scenario data to an image capturing apparatus 300 together with scenario identification numbers such as scene numbers and cut numbers used to identify a scenario.

Figure 2:
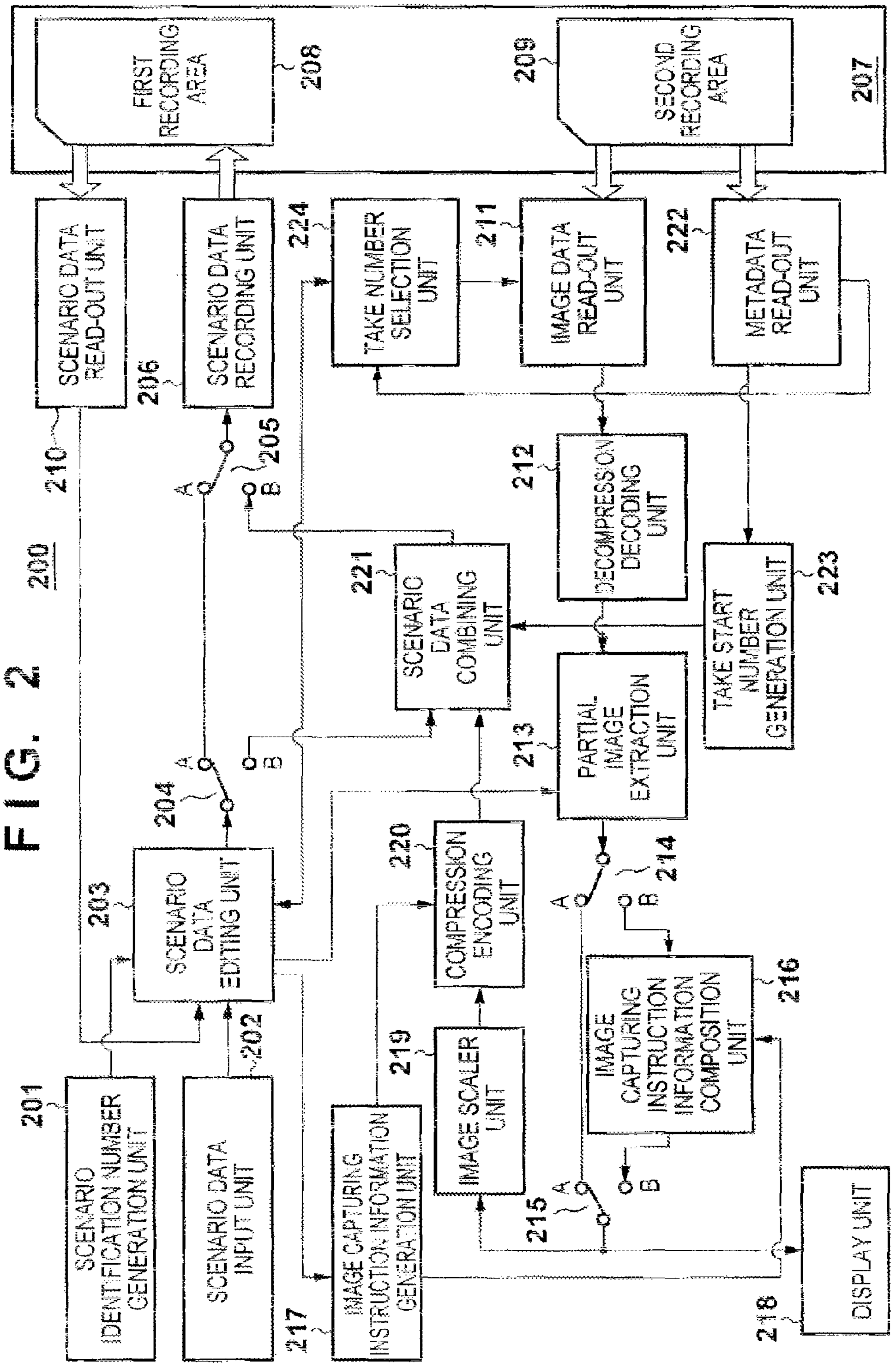
FIG. 2 is a block diagram showing the principal arrangement of a scenario editing apparatus according to the embodiment of the present invention.

Referring to FIG. 2, reference numeral 201 denotes a scenario identification number generation unit, which generates scenario identification numbers for identifying scenario data, as described above. The scenario identification numbers may be information unique to each scenario data. However, in this embodiment, hierarchical numbers including a scene number as an upper layer number and a cut number as a lower layer number, which are used in, for example, a scenario of a movie, will be exemplified.

Reference numeral 202 denotes a scenario data input unit, which inputs scenario data which represents contents to be captured of scenes and cuts. The scenario data may include text data, audio data, image data, or the like, which describes contents to be captured, or may be a combination of them.

Reference numeral 203 denotes a scenario data editing unit, which generates scenario data to be recorded by associating scenario input data and scenario identification numbers with each other.

When first scenario data which represents the contents to be captured is recorded, switches 204 and 205 are connected to terminals A, and the generated first scenario data is recorded in a first recording area 208 of a data recording module 207 by a scenario data recording unit 206.

The data recording module 207 is configured by a plurality of different recording media, which may be assigned to the first recording area 208 and a second recording area 209. Alternatively, the data recording module 207 may be a single recording medium, and the first and second recording areas 208 and 209 may be partitioned recording areas in that medium.

The data recording module 207 may be partially or fully configured by a network storage server connected via a network. In this case, the first recording area 208 is assured on the network storage, thus effectively attaining quick cooperation between the scenario editing apparatus and image capturing apparatus.

FIG. 11A shows an example of the first scenario data recorded in the first recording area 208.

In FIG. 11A, a plurality of scenario data are recorded as a list. Each scenario data has an attribute [scenario type: 1] indicating the first scenario data, and scenario identification numbers include scene numbers/cut numbers.

A scenario data body includes text information indicating a title name, and that indicating contents.

<First Image Capturing Mode>

An operation of a first image capturing mode, which captures images with reference to the first scenario data indicating the contents to be captured, will be described below with reference to FIG. 4.

Figure 4:
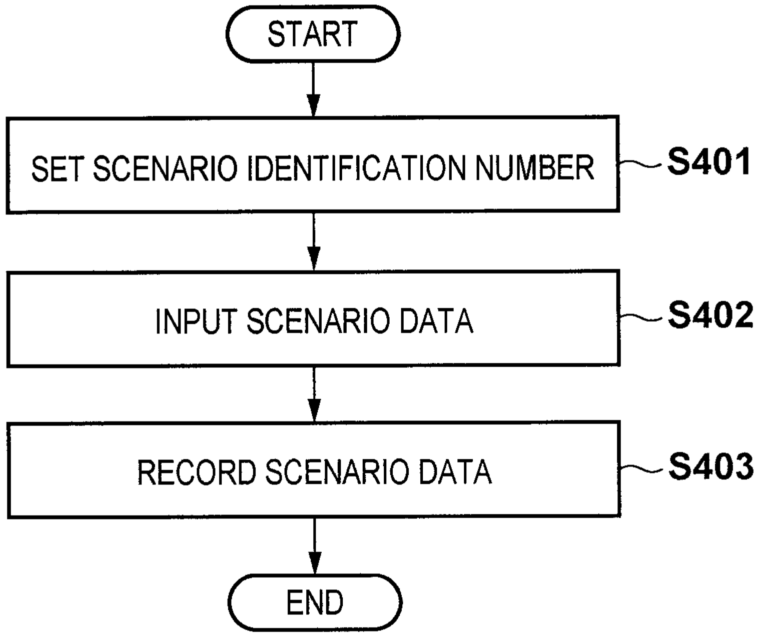
FIG. 4 is a flowchart showing processes from a first scenario data generation process until a recording process.

FIG. 4 shows processes from a first scenario data generation process until a recording process. Note that the processes shown in FIG. 4 are implemented when the CPU 101 reads out a program from the ROM 102 and executes the readout program in the PC 100 serving as the scenario editing apparatus 200.

Referring to FIG. 4, in step S401, the CPU 101 sets scenario identification numbers. As described above, in this embodiment, scene numbers and cut numbers are used as scenario identification numbers.

In step S402, the CPU 101 inputs scenario data including text data, audio data, or image data, or their combination.

In step S403, the CPU 101 records the generated first scenario data in the first recording area 208.

<Arrangement and Operation of Image Capturing Apparatus>

An operation of the image capturing apparatus, which captures images with reference to the first scenario data recorded in the first recording area 208, will be described below. As the data recording module 207 which records the first scenario data, a storage medium such as a memory card, which is detachable from the image capturing apparatus 300, is applied.

As described above, when the data recording module 207 is configured as the storage on the network, the scenario editing apparatus 200 and image capturing apparatus 300 can share data.

Figure 3:
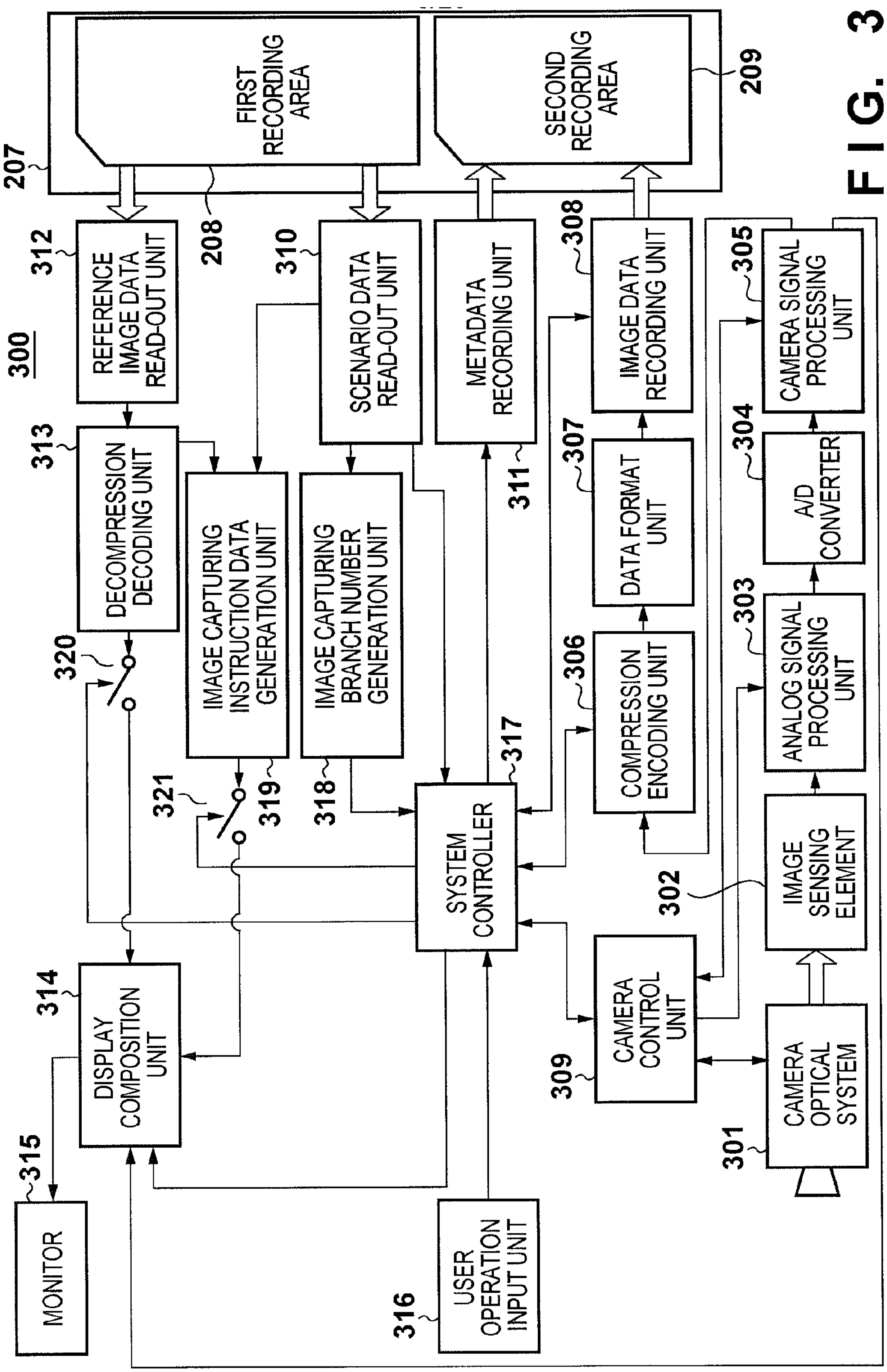
FIG. 3 is a block diagram showing the principal arrangement of an image capturing apparatus according to the embodiment of the present invention.

FIG. 3 is a block diagram showing the principal arrangement of the image capturing apparatus 300 of this embodiment. Note that this embodiment will explain an image capturing function related to the present invention and explanations about arrangements for reproducing image data and to recording/reproducing audio data are omitted.

In order to capture images with reference to the first scenario data recorded in the first recording area 208, a scenario data read-out unit 310 reads out the first scenario data from the first recording area 208, and provides the readout data to a system controller 317.

The system controller 317 controls a display composition unit 314 to superimpose and display scenario data on a monitor 315. In this embodiment, a list of scene numbers and cut numbers as scenario identification numbers, and titles is displayed. A photographer selects a scenario to be captured, and then executes image capturing operations.

A photographer's choice is provided from a user operation input unit 316 to the system controller 317, and the selected scenario identification numbers are recorded in association with image data to be captured. After that, when an image capturing start operation is input from the user operation input unit 316, the system controller 317 controls a camera control unit 309, compression encoding unit 306, and image data recording unit 308 to start recording of image data.

A camera optical system 301 drives an optical lens system to capture an image, and an image sensing element 302 converts the captured image into an electrical signal under the control of the camera control unit 309.

An analog signal processing unit 303 amplifies an electrical signal from the image sensing element 302 to a predetermined level, and an A/D converter 304 converts the amplified signal into a digital signal.

A camera signal processing unit 305 generates image data by applying predetermined digital development processing to output data of the image sensing element, which has been converted into a digital signal, under the control of the camera control unit 309, and then applies camera signal processing such as white balance, color adjustment, and γ conversion to the image data.

The compression encoding unit 306 reduces a data size by compression-encoding the image data. Examples of compression encoding include MPEG2 and H.264 for a moving image, and JPEG and the like for a still image.

A data format unit 307 converts the compression-encoded image data into a recording data format, and the image data recording unit 308 records the converted data in the second recording area 209 of the data recording module 207.

A metadata recording unit 311 records camera control information from the camera control unit 309, compression encoding information from the compression encoding unit 306, and user operations, system setting information, and the like from the system controller 317 as camera metadata in the second recording area 209.

Also, the metadata recording unit 311 records the scenario identification numbers, which are selected and held upon execution of the image capturing operation, as metadata in association with the image data. Furthermore, when the image capturing operation is performed a plurality of times for the same scenario identification number, take numbers as image capturing branch numbers for identifying respective image capturing operations are recorded together.

When the image capturing apparatus main body has a function of setting a flag in captured image data during or after an image capturing operation, flag information as user operation information from the system controller 317 can be recorded in metadata. As an example of this flag, take priority information such as an image capturing take=OK or NG may be used.

Figure 8:
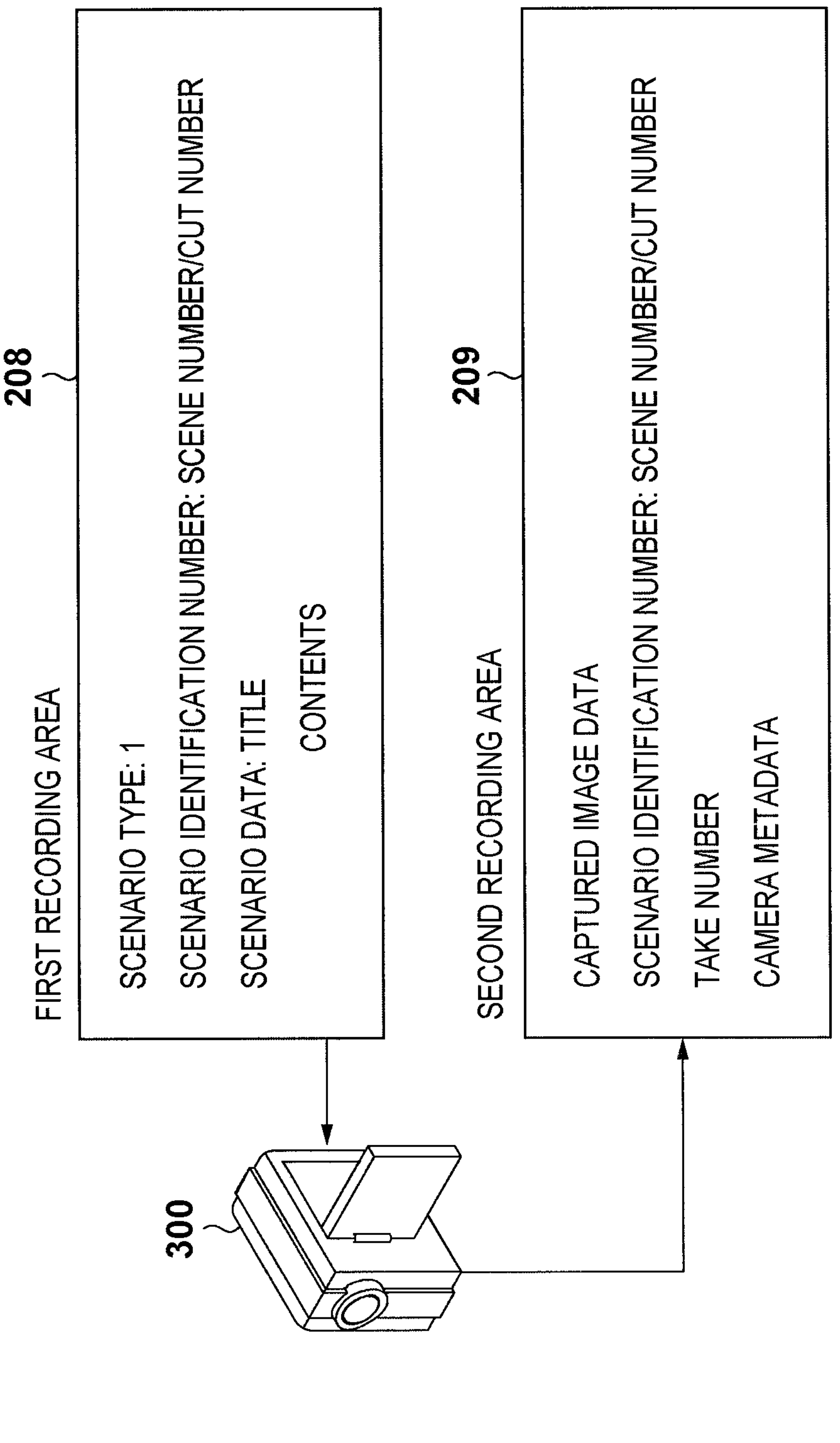
FIG. 8 is a view showing the sequence of data from the first scenario reference process until the image capturing process.

FIG. 8 shows the sequence of data from a first scenario data reference process until an image capturing process. The image capturing apparatus 300 refers to the first scenario data read out from the first recording area 208, and then records captured image data and metadata in the second recording area 209 in association with the scenario identification numbers of the referred first scenario data.

Figure 5:
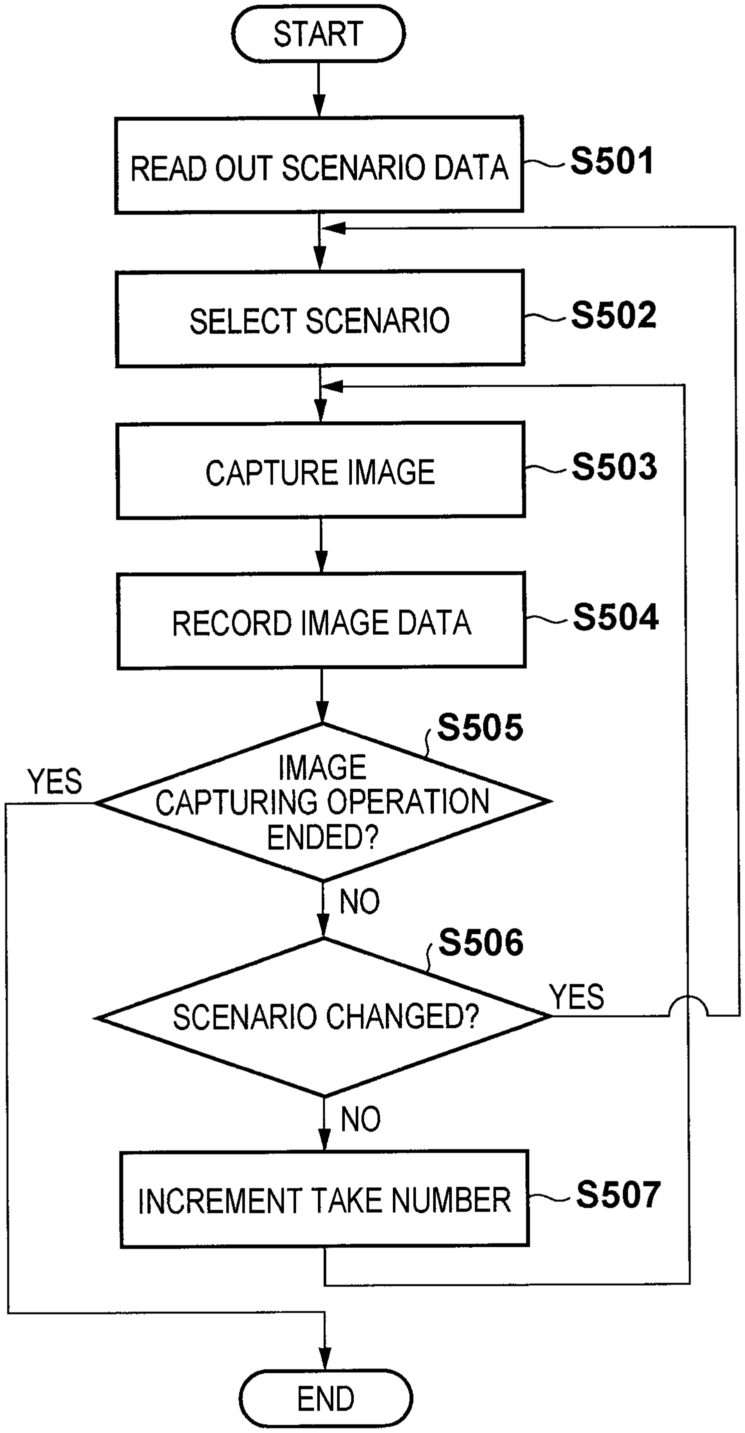
FIG. 5 is a flowchart showing processes from a first scenario data reference process until an image capturing process.

FIG. 5 shows processes from the first scenario data reference process until the image capturing process. Note that the processes shown in FIG. 5 are implemented when the system controller 317 of the image capturing apparatus 300 reads out a program from a memory, and executes the readout program.

In step S501, the system controller 317 reads out the first scenario data from the first recording area 208. In step S502, a scenario is selected by a user operation.

The system controller 317 executes image capturing operations based on the selected scenario in step S503, and records the captured image data in the second recording area 209, in step S504.

If an image capturing end operation is selected in step S505, the system controller 317 ends all image capturing processes; otherwise, it checks in step S506 whether or not a scenario change operation is selected.

If a scenario change operation is selected in step S506, the process returns to step S502; otherwise, the system controller 317 determines that a plurality of image capturing operations are executed for the same scenario, and the process advances to step S507. In step S507, the system controller 317 increments a take number, and the process then returns to the image capturing process in step S503.

As a result of image capturing operations executed with reference to the first scenario data recorded in the first recording area 208, as described above, a plurality of captured image data and metadata associated with the scenario identification numbers of the referred scenario data are recorded in the second recording area 209.

Figure 9A:
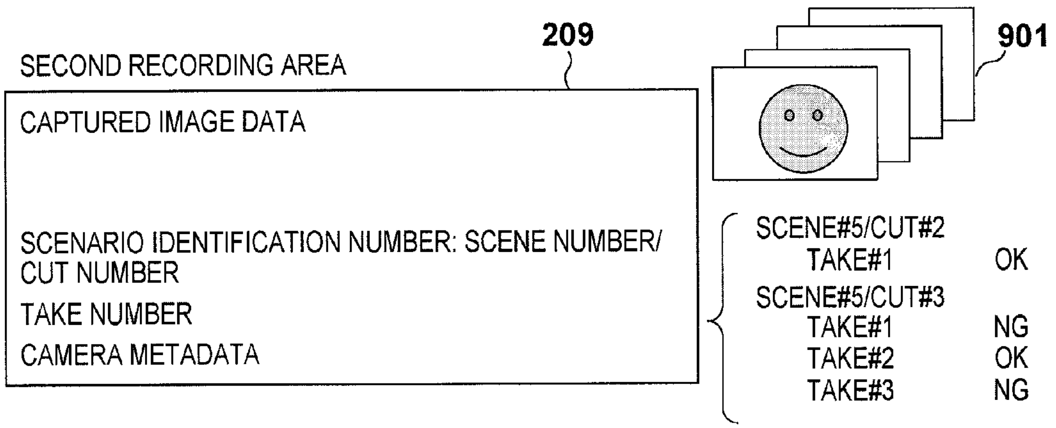
FIGS. 9A and 9B are views showing examples of data in first and second recording areas.

FIG. 9A shows an example of data in the second recording area 209 after the image capturing operations. Reference numeral 901 denotes captured image data. In this case, a total of four image data capturing operations have been executed with reference to two scenarios, that is, [scene #5/cut #2] and [scene #5/cut #3], and image data are recorded together with pieces of OK/NG flag information indicating priority levels of image capturing takes.

Processing for editing the captured image data and metadata in the second recording area 209, which have been captured with reference to the first scenario data in the first recording area 208, and recording second scenario data to be re-captured in the first recording area 208 will be described below with reference to FIG. 2.

A metadata read-out unit 222 reads out metadata of captured image data associated with the first scenario data from the second recording area 209.

A take number selection unit 224 extracts scene numbers, cut numbers, take numbers as image capturing branch numbers, and pieces of priority information of takes if they are available from the readout metadata, and holds them.

The scenario data editing unit 203 decides image data to be reproduced and displayed based on the held information, and instructs the take number selection unit 224 of the decided image data.

An image data read-out unit 211 reads out the image data selected by the take number selection unit 224, and decodes them using a decompression decoding unit 212.

A partial image extraction unit 213 extracts frames to be reproduced of the decoded image data. When all frames of the image data are to be reproduced, all the frames are extracted; when only an opening image is to be reproduced, partial image data corresponding to the predetermined number of opening frames is extracted.

In case of the reproduction display operation, switches 214 and 215 are connected to terminals A, and a decoded image is displayed on a display unit 218.

A scenario data editor judges the scene numbers, cut numbers, take numbers, pieces of take priority information, and contents to be reproduced and displayed. As a result, the editor selects the scenario required to be re-captured, and instructs the scenario data editing unit 203 of the scenario required to be re-captured via the scenario data input unit 202. The scenario to be re-captured is not limited to that based on an operation of the scenario data editor, but it may be automatically selected using take priority flags set upon execution of image capturing operations.

The scenario data editing unit 203 instructs the take number selection unit 224 of the scenario identification numbers of the scenario instructed to be re-captured. The image data read-out unit 211 reads out, from the second recording area 209, image data of takes used as reference image data in a re-capturing operation of the captured image data with reference to the scenario to be re-captured.

The reference image data are image data which are recorded in the first recording area 208 as partial data of second scenario data to be re-captured, and can be reproduced by the image capturing apparatus 300 as reference data used to reproduce compositions, camera works, and performances of performers upon execution of the re-capturing operation.

When a plurality of captured image data are available for the scenario to be re-captured, an optimal take is selected as reference image data for the re-capturing operation. When take priority flags are set in the image capturing operations, as described above, more suitable reference image data can be generated by selecting a take with a highest priority level.

The selection method of an optimal take from a plurality of takes is not limited to this. For example, the scenario data editor may select an optimal take based on a reproduction display result. Alternatively, the following methods may be used. For example, metadata of the captured image data may be analyzed to select a take captured in a better state based on camera information such as focus data and aperture data, or image data may be analyzed to select a take in a better state.

The decompression decoding unit 212 decodes the readout image data.

The partial image extraction unit 213 extracts frames to be used as reference image data from the selected image data. When all image data are used as reference image data, all frames are extracted; when only an opening image is used as reference image data, partial image data corresponding to the predetermined number of opening frames is extracted.

The scenario data editor designates frames to be extracted using the scenario data input unit 202 while viewing the display unit 218, thus allowing to extract arbitrary frames.

Extraction of partial image data is not limited to that of a predetermined section of an image on a time axis, but it may be spatial extraction of some field angles of respective frames. Thus, a composition may be partially extracted as reference image data.

In this embodiment, image capturing instruction information for a re-capturing operation can be included in the second scenario data. An image capturing instruction information generation unit 217 generates image capturing instruction information according to an instruction of the scenario data editing unit 203. The scenario data editor inputs image capturing instruction information using the scenario data input unit 202.

The image capturing instruction information may be either text data or image data. As an example of text data, instructions such as "further brighter" and "zoom-up" to camera works and performers in an image capturing operation may be used. As an example of image data, a designation of a composition written in a screen using a pen tablet or the like may be used.

Since the image capturing instruction information can be displayed in synchronism with reproduction of the reference image data, it may be information to be temporally updated such as instructions according to motions.

The image capturing instruction information can also be recorded as image data to be superimposed on the reference image data, or can be multiplexed as sub-data of the reference image data, and can be composited at the time of reproduction. In the former case, since font data and the like are not required, hardware of the image capturing apparatus can be simplified. In the latter case, an image capturing instruction information display mode can be set to be ON/OFF at the time of reproduction, thus enhancing visibility of the reference image data.

When the image capturing instruction information is superimposed on the reference image data, the switches 214 and 215 are connected to terminals B, and an image capturing instruction information composition unit 216 superimposes the image capturing instruction information on the image data.

When the image capturing instruction information is text data, a font size of text to be superimposed can be set. This font size can be decided from a screen size of the monitor 315 of the image capturing apparatus 300, a display size of the reference image data on the monitor 315, the number of text characters, and the like. When the number of text characters is large, the text data can be superimposed and displayed on a screen as scroll text.

When the image capturing instruction information is multiplexed as sub-data, the switches 214 and 215 are connected to the terminals A, so as not to superimpose that information on the image data. The image capturing instruction information is provided from the image capturing instruction information generation unit 217 to the compression encoding unit 220, and is multiplexed on a stream of image data. Text multiplexing can use, for example, caption data that uses a text subtitle format.

An image scaler 219 scales a display size of image data, and converts that size to a size optimal to the monitor 315 of the image capturing apparatus 300. Normally, a video camera or the like has a compact monitor, and the display size is converted to that suited to that monitor, thus omitting reduction processing in the image capturing apparatus. Also, a data size of the reference image data can be reduced.

The compression encoding unit 220 converts image data to a size optimal to reference image data by compression-encoding the image data to reduce its data size.

The reference image data is premised on the reproduction by the monitor of the image capturing apparatus, and does not pose any practical problem if it is compressed at a higher compression ratio than the captured image data. Since the data size also becomes small, the reference image data can be optimally recorded as the second scenario data in the first recording area 208.

When the first recording area 208 does not allow a high-speed read access, the reference image data can be reproduced smoother as its size is smaller. Hence, the compression ratio of compression encoding can be optimized according to the read access speed of the first recording area 208. Especially, it is effective when the first recording area 208 is configured by the storage on the network.

Also, the compression ratio of compression encoding can be changed according to the reproduction capability of the image capturing apparatus 300. Even when the ability of a decoder is low, smooth reproduction is allowed, and it is effective to reduce hardware components of the image capturing apparatus 300.

Furthermore, a compression encoding method may be changed from a compression method of the captured image data, and may be optimized to a decoder of the image capturing apparatus 300.

This is effective when, for example, the image capturing apparatus 300 uses a RAW data recording method that records raw data of an image capturing sensor, and uses proxy data which undergoes simple compression to reproduce that data in the camera since reproduction of RAW data requires large-scale hardware. In this case, the compression encoding unit 220 uses a proxy data compression method to also allow the image capturing apparatus 300 to reproduce the reference image data.

In order to generate second scenario data to be re-captured, the scenario data read-out unit 210 reads out scenario data having corresponding scenario identification numbers from the first recording area 208, and provides them to the scenario data editing unit 203.

In this case, both the first and second recording areas 208 and 209 are required. When data are held in the apparatus upon generation of the aforementioned first scenario data, scenario data of the corresponding scenario identification numbers can also be read out. Thus, the need for reading out scenario data from the first recording area 208 can be obviated.

When the second scenario data to be re-captured is to be generated, the switches 204 and 205 are connected to the terminals B, and the readout scenario data for the original image data are provided from the scenario data editing unit 203 to a scenario data combining unit 221. In this case, [scenario data type] is set to be [type 2] indicating the second scenario data to be re-captured.

The scenario data combining unit 221 combines the reference image data compression-encoded by the compression encoding unit 220 to the second scenario data.

The second scenario data can include a take start number as image capturing branch number inheritance information. This number is obtained by calculating a next take number to be appended based on the take number upon capturing original image data. A take start number generation unit 223 generates the take start number with reference to the take number information in the metadata, and the scenario data combining unit 221 combines that number to the second scenario data.

<Second Image Capturing Mode>

An operation of a second image capturing mode, which captures images with reference to the second scenario data, which is scenario data to be re-captured after the image capturing operations with reference to the first scenario data, and includes reference image data generated from the captured image data, will be described below.

The second scenario data is that including assistant information which facilitates image capturing operations when a scenario to be re-captured is captured again after the image capturing operations with reference to the first scenario data. The assistant information includes scenario identification numbers of corresponding first scenario data, which are incorporated with the original first scenario data. Also, the assistant information includes reference image data generated from image data captured with reference to the first scenario data, in order to confirm image capturing results based on the first scenario data.

Using the reference image data, the user can easily confirm, on the image capturing apparatus main body, the compositions, performances, camera works, and problems resulting in NG takes in the previous image capturing operations, thus remarkably improving the re-capturing efficiency.

As the assistant information, a take start number as image capturing branch number inheritance information that facilitates data management after the image capturing operations can be included by inheriting the take number in the image capturing operations based on the original first scenario data.

By setting the maximum value of the take number+1 in the original image data to be the take start number, continuity of the take numbers in the re-capturing operations can be maintained.

Alternatively, by setting the minimum value of the take number+N in the original image data, for example, when N=100, the number of re-capturing times can be expressed in the 100s.

The second scenario data to be re-captured combined by the scenario data combining unit 221 is recorded in the first recording area 208 by the scenario data recording unit 206.

Furthermore, as the assistant information, the second scenario data can include image capturing instruction information for the re-capturing operations. The image capturing instruction information may be either text data or image data. As an example of text data, instructions such as "further brighter" and "zoom-up" to camera works and performers in image capturing operations may be used. As an example of image data, a designation of a composition written in a screen using a pen tablet or the like may be used.

FIG. 11B shows an example of the second scenario data recorded in the first recording area 208.

In this case, a plurality of scenario data are recorded as a list, each scenario data has an attribute [scenario type: 2] indicating the second scenario data, and scenario identification numbers include scene numbers/cut numbers.

A scenario data body includes text information indicating a title name, that indicating contents, a take start number as image capturing branch number inheritance information, image capturing instruction information, and reference image data.

Figure 6:
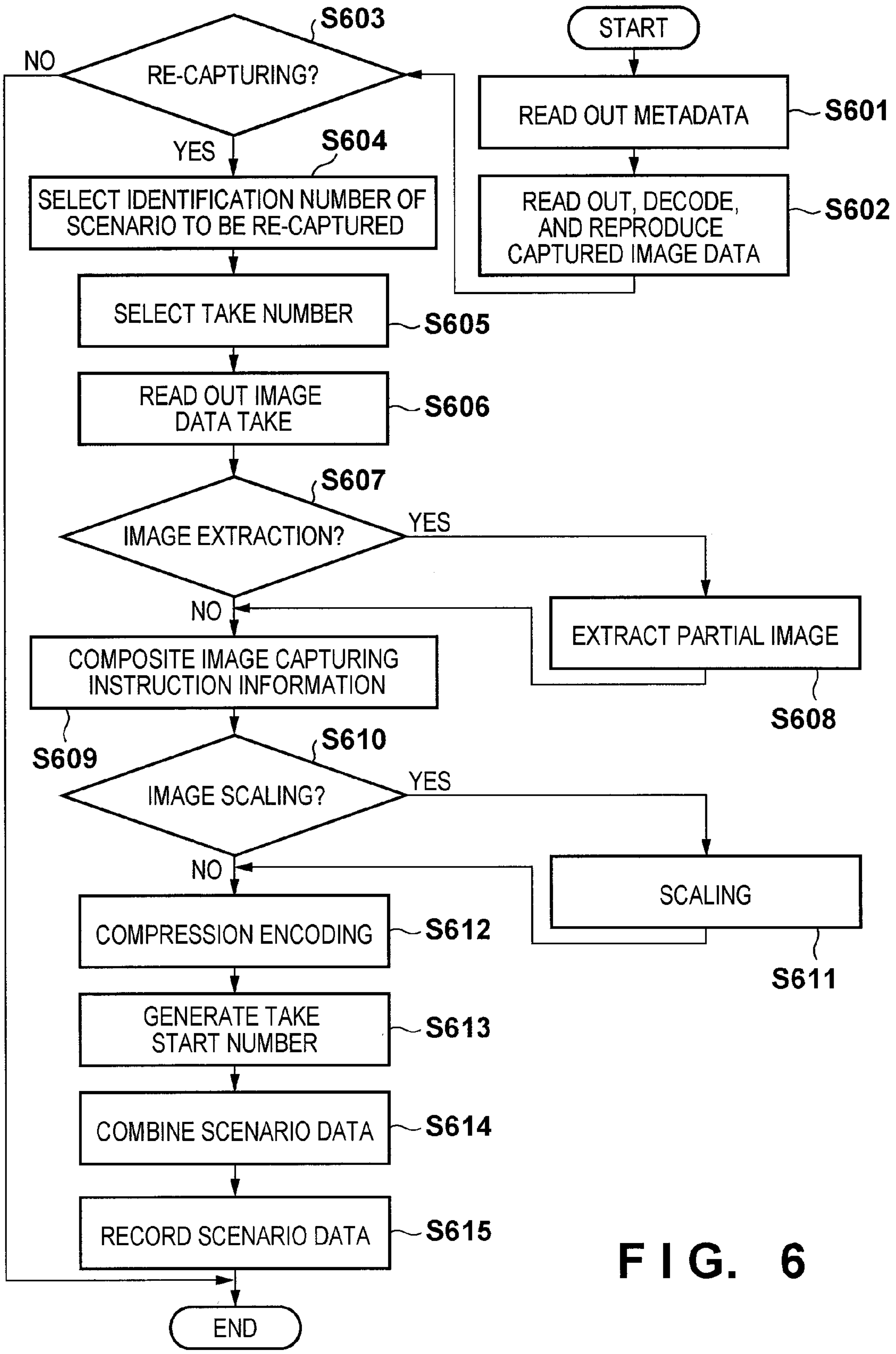
FIG. 6 is a flowchart showing processes from a second scenario data generation process until a recording process.

FIG. 6 shows processes from a second scenario data generation process until a recording process. Note that the processes shown in FIG. 6 are implemented when the CPU 101 reads out a program from the ROM 102 and executes the readout program in the PC 100 serving as the scenario editing apparatus 200.

Referring to FIG. 6, in step S601, the CPU 101 reads out metadata of captured image data from the second recording area 209.

In step S602, the CPU 101 reads out, decodes, and reproduces the captured image data, so as to confirm images to be re-captured by reproduction.

If the re-capturing operations are executed in step S603, the CPU 101 selects scenario identification numbers to be re-captured in step S604.

In step S605, the CPU 101 selects a take number optimal to the reference image data based on take priority information and the like.

In step S606, the CPU 101 reads out image data of the selected take number.

The CPU 101 determines in step S607 whether or not a partial image is to be extracted. If a partial image is to be extracted, the CPU 101 extracts a partial image in step S608.

In step S609, the CPU 101 combines the input image capturing instruction information.

The CPU 101 determines in step 5610 whether or not to scale an image. If an image is to be scaled, the CPU 101 scales the image in step S611.

In step S612, the CPU 101 compression-encodes reference image data.

In step S613, the CPU 101 generates a take start number from a take number of original image data.

In step S614, the CPU 101 combines scenario data. In step S615, the CPU 101 records the combined second scenario data in the first recording area 208.

Figure 9B:
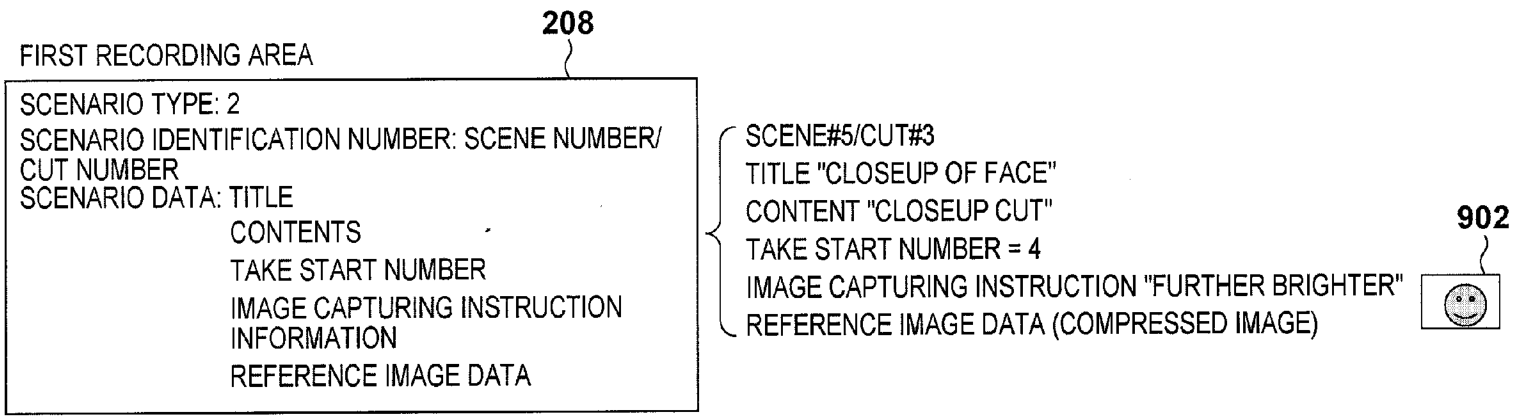

FIG. 9B shows an example of the second scenario data to be re-captured, which is recorded by the aforementioned processes. In this case, [scene #5/cut #3] is instructed to be re-captured, and "4" is designated as a take start number.

As the image capturing instruction information, text data "further brighter" is recorded while being superimposed on reference image data 902 or multiplexed on a stream.

Processing executed when the image capturing apparatus 300 executes image capturing operations with reference to this second scenario data to be re-captured will be described below with reference to FIG. 3.

In order to execute the re-capturing operations with reference to the second scenario data recorded in the first recording area 208, the scenario data read-out unit 310 reads out the second scenario data from the first recording area 208, and provides it to the system controller 317.

The system controller 317 controls the display composition unit 314 to superimpose the scenario data on the captured image, and displays the composite image on the monitor 315. In this embodiment, a list of scene numbers and cut numbers as the scenario identification numbers, and titles is displayed. The photographer selects a scenario to be re-captured from this list.

In case of the second scenario data having [scenario type: 2], the reference image data read-out unit 312 reads out the reference image data from the first recording area 208, and the decompression decoding unit 313 decodes the readout data and provides the decoded data to the display composition unit 314.

In this case, the image capturing instruction information, which is multiplexed on a stream, is demultiplexed and decoded, and the decoded information is provided to the display composition unit 314. In this case, the system controller can turn on/off an image capturing instruction information display mode.

When a reproduction instruction of the reference image data is issued by a user operation input to the user operation input unit 316, a switch 320 is turned on under the control of the system controller 317, and a reproduced image of the reference image data is provided to the display composition unit 314.

When the image capturing instruction information is multiplexed on a stream of the reference image data, the decompression decoding unit 313 demultiplexes and decodes that information, and provides the decoded information to an image capturing instruction data generation unit 319. Since the image capturing instruction information multiplexed on an image data stream can be reproduced in synchronism with the reference image data, fine instructions corresponding to scenes can be provided. Or when the image capturing instruction information is included in the scenario data, the image capturing instruction information is provided from the scenario data read-out unit 310 to the image capturing instruction data generation unit 319. The image capturing instruction information included in the scenario data can be easily generated as text data or the like.

The image capturing instruction data generation unit 319 generates image capturing instruction data to composite the image capturing instruction information provided from the scenario data read-out unit 310 on display data to be displayed on the monitor 315.

When a reproduction instruction of the image capturing instruction information is issued by a user operation input to the user operation input unit 316, a switch 321 is turned on under the control of the system controller 317, and the image capturing instruction data is provided to the display composition unit 314.

The display composition unit 314 displays the reference image data and the image capturing instruction information by switching from an image to be captured, which is displayed on the monitor, or superimposing them on that image. The photographer can confirm compositions, performances, and the like to be re-captured by reproducing the reference image data.

When the second scenario data includes the take start number as the image capturing branch number inheritance information, the scenario data read-out unit 310 provides the take start number to an image capturing branch number generation unit 318.

The image capturing branch number generation unit 318 generates a take number with reference to the take start number included in the scenario data for only the first image capturing operation, which is to be executed for an identical scenario with reference to the second scenario data.

As described above, by setting the take start number as a take number of the current image capturing operation, continuity of take numbers with the image capturing operations based on the first scenario data can be maintained.

Alternatively, by starting a take number from a value obtained by adding a predetermined value N to the take start number, original image capturing takes and re-capturing takes can be identified from each other.

In the second or subsequent image capturing operation for the identical scenario, a value obtained by adding a predetermined number to that of the immediately preceding image capturing operation is generated as a take number.

The generated take number is provided to the system controller 317, and the metadata recording unit 311 records that take number together with the scene number and cut number as the scenario identification numbers in the second recording area 209.

After that, since the processing after the beginning of the image capturing operation is the same as that in case of the image capturing operations based on the aforementioned first scenario data, a description thereof will not be repeated.

Figure 10:
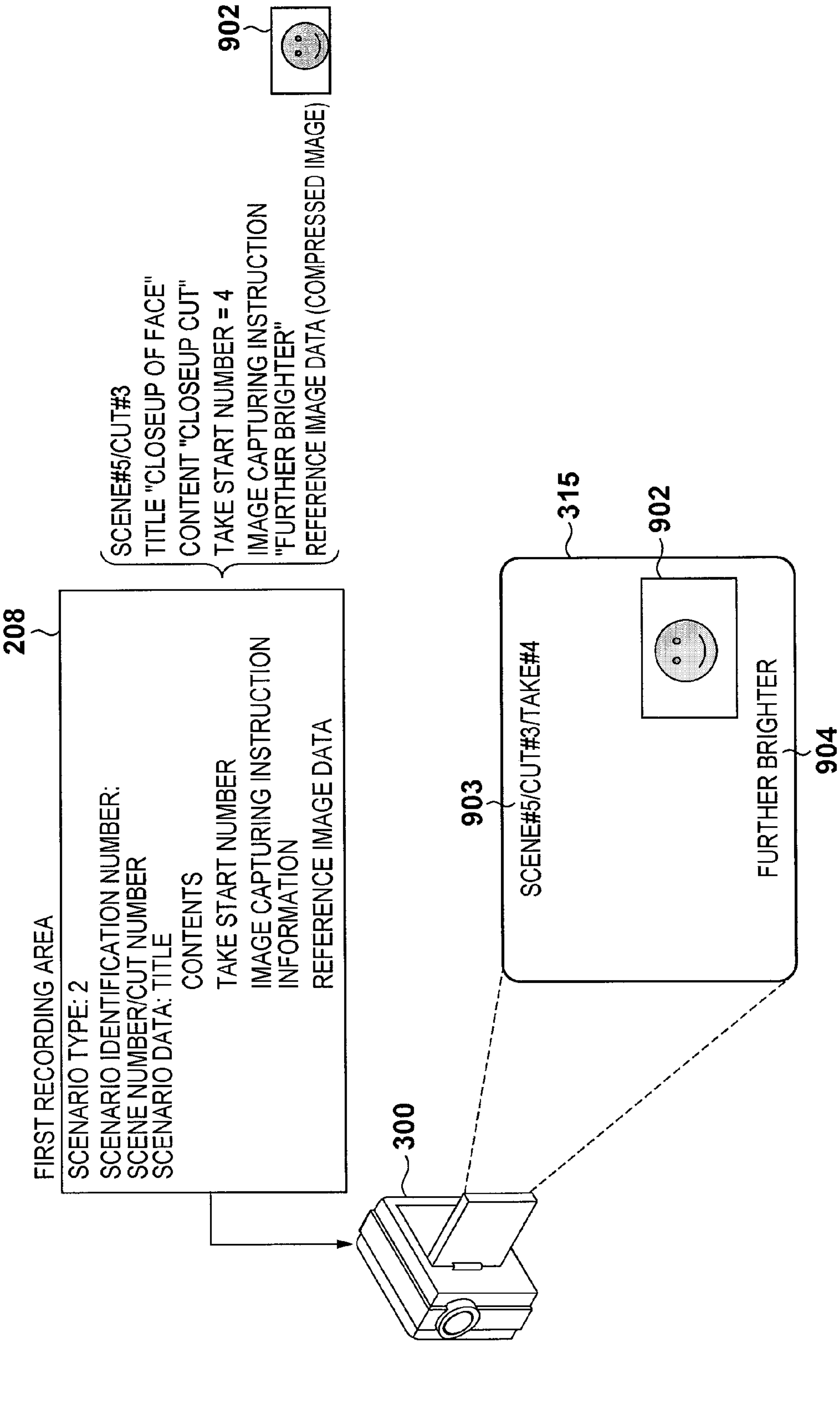
FIG. 10 is a view for explaining the operation of the image capturing apparatus when it refers to second scenario data.

FIG. 10 shows the operation of the image capturing apparatus with reference to the second scenario data as described above. The image capturing apparatus 300 reads out the second scenario data from the first recording area 208. In this case, [scene #5/cut #3/take #4] is designated as scenario identification numbers 903, which configure the second scenario data to be re-captured, and image capturing instruction information "further brighter" as text data and reference image data 902 are included.

On the monitor 315 of the image capturing apparatus 300, which refers to the second scenario data, the reference image data 902, which is composited by the aforementioned display composition unit 314, is superimposed and displayed, and "further brighter" as image capturing instruction information 904 is similarly superimposed and displayed as a text caption.

Figure 7:
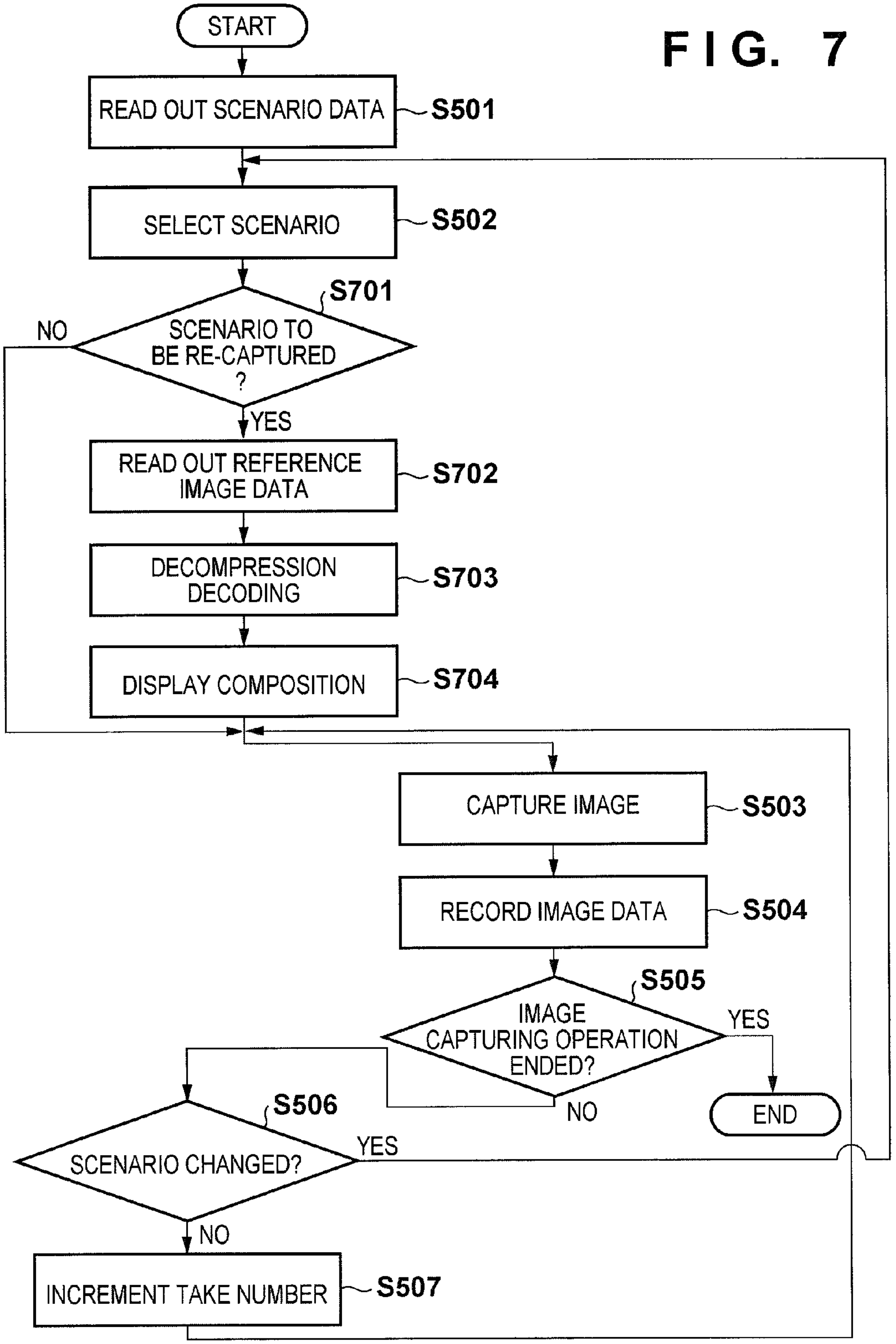
FIG. 7 is a flowchart showing processes from a second scenario data reference process until an image capturing process.

FIG. 7 shows processes from a second scenario data reference process until an image capturing process. Note that the processes shown in FIG. 7 are implemented when the system controller 317 of the image capturing apparatus 300 reads out a program from a memory, and executes the readout program.

Referring to FIG. 7, in step S501, the system controller 317 reads out the second scenario data to be re-captured from the first recording area 208. In step S502, a scenario is selected by a user operation.

In step S701, the system controller 317 determines a scenario data type. If the scenario data type is "2", the process advances to step S702. On the other hand, if the type is not "2", the process jumps to step S503 to execute image capturing operations with reference to the first scenario data.

The system controller 317 reads out the reference image data included in the second scenario data from the first recording area 208 in step S702, and decompression-decodes the readout data in step S703.

In step S704, the system controller 317 superimposes and displays the reference image data as a composite image on a normal image capturing screen.

Since the operations in steps S503 and subsequent steps are the same as those in the aforementioned image capturing operations to be executed with reference to the first scenario data, a description thereof will not be repeated.

As described above, when the re-capturing operations are executed with reference to the second scenario data recorded in the first recording area 208, compositions, performances, and the like at the time of capturing original images can be confirmed by displaying the reference image data included in the second scenario data, thus, improving the convenience at the time of re-capturing operations.

<Screen Display Example in Second Image Capturing Mode>

Figure 12:
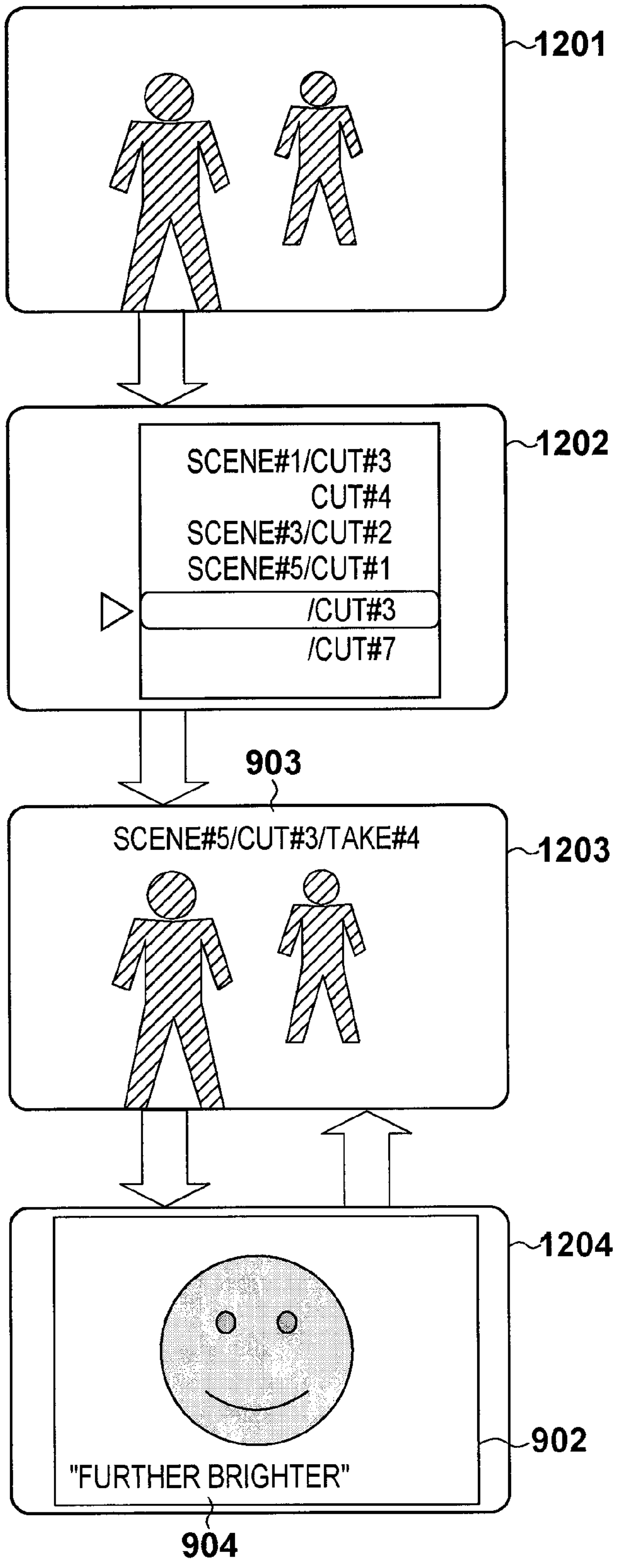
FIG. 12 shows a screen display example in a second image capturing mode.

FIG. 12 shows a screen display example on the monitor 315 in the second image capturing mode, that is, a normal image capturing screen on which an image which is being captured by the image capturing apparatus 300 is displayed. Note that pieces of image capturing information such as an aperture value and shutter speed to be displayed are not shown.

When the photographer inputs a reference instruction of the second scenario data on the normal image capturing screen, the current screen is switched to a scenario selection screen 1202 in a scenario view mode, and second scenario data read out from the first recording area 208 are displayed in a list.

When a scenario is selected on the scenario selection screen 1202, the image capturing apparatus 300 transits to the second image capturing mode, and a scenario reference image capturing screen 1203 is displayed. On the scenario reference image capturing screen 1203, the scenario identification numbers 903 and the take number generated as described above are displayed together with an image which is being captured.

In the second image capturing mode, the reference image data included in the second scenario data can be reproduced. When the photographer inputs a reproduction instruction of the reference image data on the scenario reference image capturing screen 1203, the screen 1203 is switched to a reference image reproduction screen 1204, and the reference image data 902 and image capturing instruction information 904 included in the second scenario data are superimposed and displayed.

Figure 13:
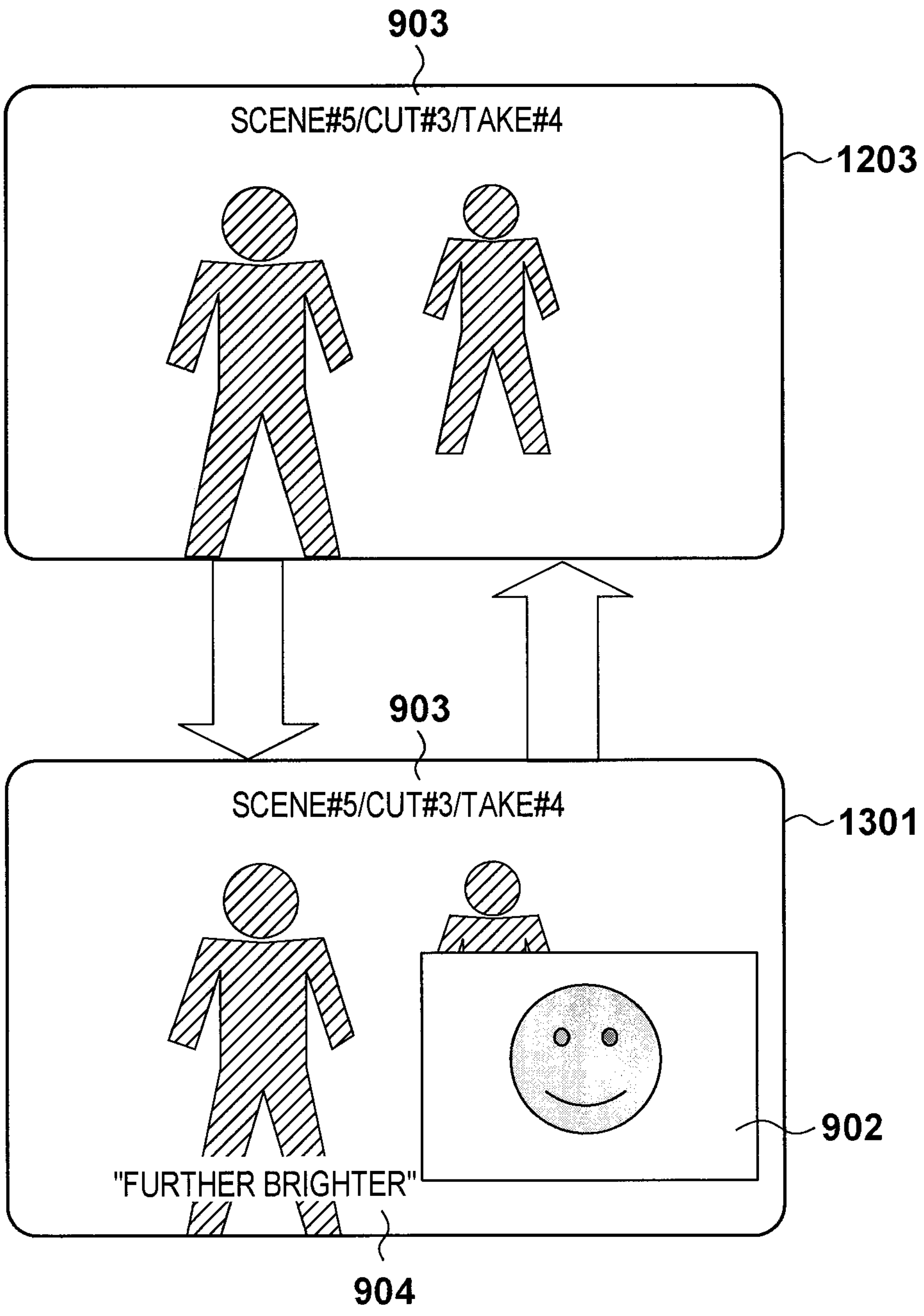
FIG. 13 shows another screen display example for reference image data.

As another display example of reference image data, FIG. 13 shows an example in which a reproduction screen is displayed in the image capturing screen in a picture-in-picture format. In this example, when the photographer inputs a reproduction instruction of the reference image data on the scenario reference image capturing screen 1203, the screen 1203 transits to a picture-in-picture display screen 1301, and he or she can confirm an image which is being captured, the reference image data 902, and image capturing instruction information 904 at the same time. This display method example is effective when the photographer wants to confirm a camera work timing and the like.

Figure 14:
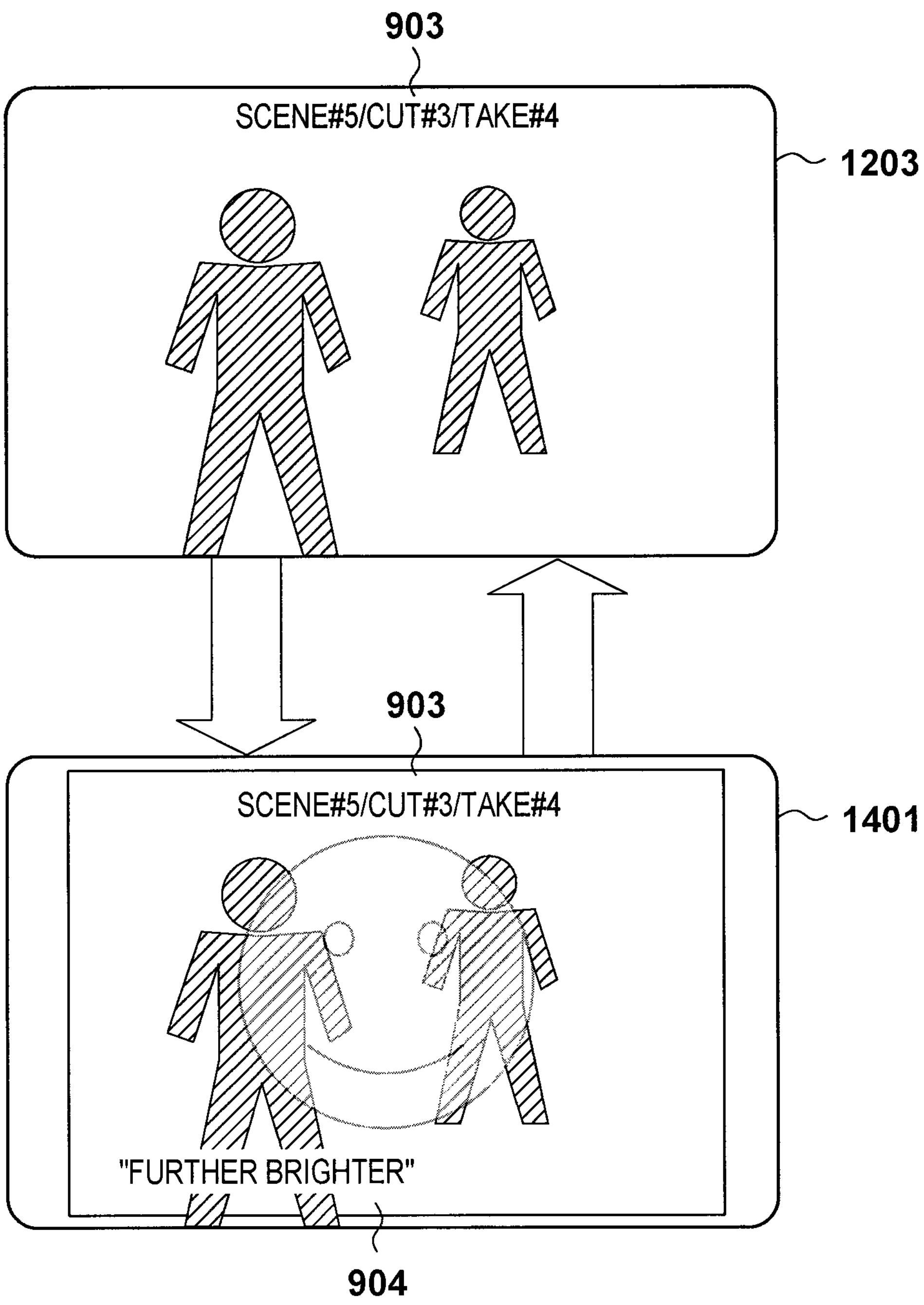
FIG. 14 shows still another screen display example for reference image data.

As still another reference image data display example, FIG. 14 shows an example in which a reproduction screen is displayed in the image capturing screen in an overlay format. In this example, when the photographer inputs a reproduction instruction of the reference image data on the scenario reference image capturing screen 1203, the screen 1203 is switched to a reference image data overlay display screen 1401, and he or she can confirm an image which is being captured, the reference image data 902, and image capturing instruction information 904 at the same time. This display method example is effective when the photographer wants to strictly match a composition and the like.

Figure 15:
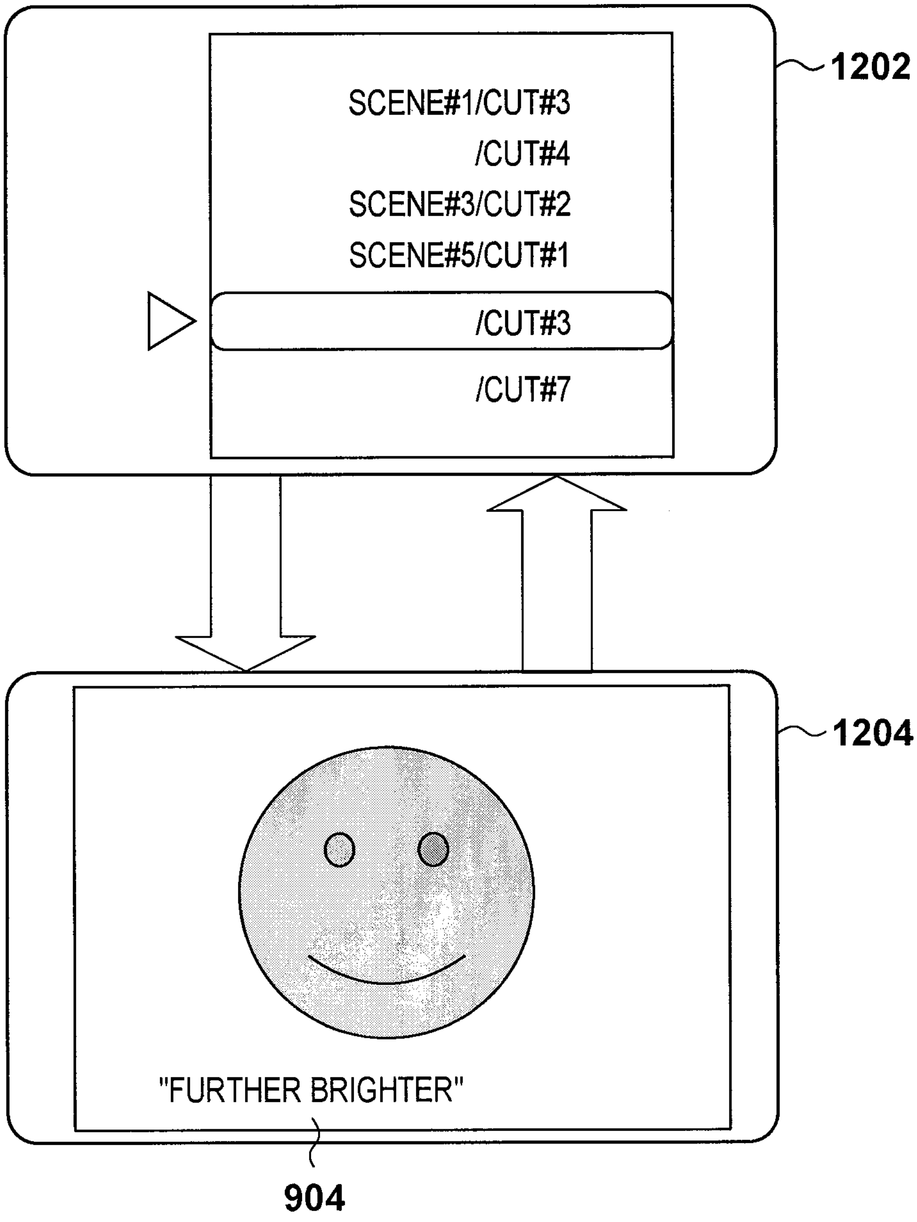
FIG. 15 shows a display example of reference image data on a scenario selection screen shown in FIG. 12.

FIG. 15 shows an example in which a reference image data display instruction is input on the scenario selection screen 1202 shown in FIG. 12. In this example, when the photographer inputs a reproduction instruction of the reference image data on the scenario selection screen 1202, the screen 1202 is switched to the reference image reproduction screen 1204, and the reference image data 902 and image capturing instruction information 904 included in the selected second scenario data are superimposed and displayed. This display method example allows the photographer to confirm contents to be re-captured using the reference image data upon selection of scenario data, thus facilitating scenario confirmation.

As described above, when the re-capturing operations are to be executed with reference to the second scenario data recorded in the first recording. area, compositions, performances, and the like at the time of capturing original images can be confirmed by displaying the reference image data included in the second scenario data, thus improving the convenience at the time of re-capturing operations. Also, scenario numbers and take numbers are automatically inherited, thus also improving the convenience of data management after the image capturing operations.

[Second Embodiment]

The second embodiment will be described hereinafter. This embodiment will exemplify a case in which the reference image data included in the second scenario data, which is referred to upon reproduction of image data captured in the second image capturing mode described in the aforementioned first embodiment, is reproduced to allow easy confirmation of image capturing operations. Note that the arrangement of the image capturing apparatus is as shown in FIG. 3.

Figure 16:
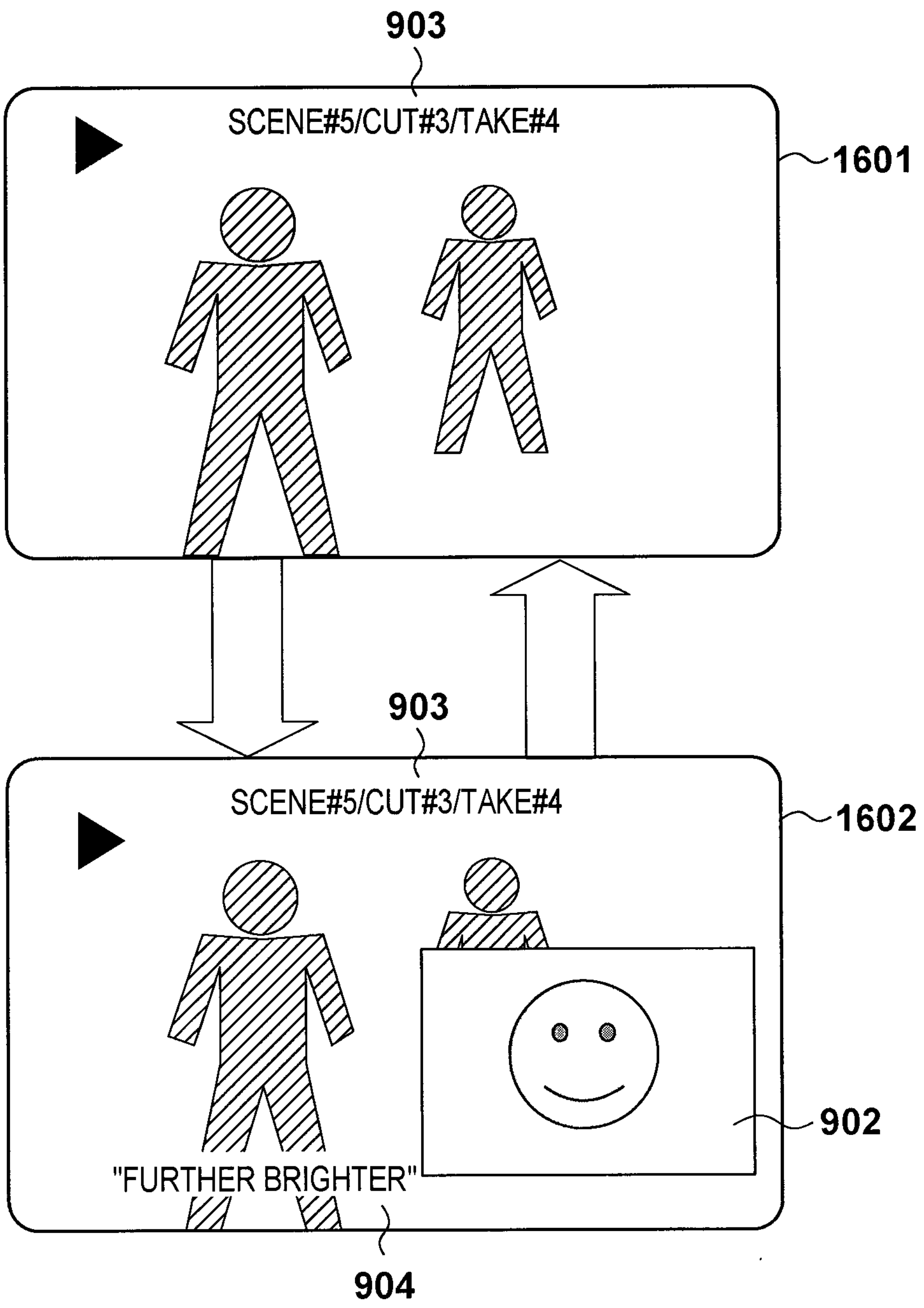
FIG. 16 shows a screen display example according to the second embodiment.

FIG. 16 shows a screen display example on the monitor 315 according to this embodiment. Reference numeral 1601 denotes a captured image reproduction screen. Note that pieces of image capturing information such as an aperture value and shutter speed to be displayed are not shown.

When the photographer inputs a reproduction instruction of reference image data on the captured image reproduction screen 1601, the screen 1601 is switched to a reference image reproduction screen 1602, and the reference image data 902 and image capturing instruction information 904 included in the second scenario data are superimposed and displayed.

In this case, only the picture-in-picture example in the first embodiment is shown. However, the display method of the reference image data on the reproduction screen is not limited to this. For example, a screen switching method or overlay display method may be used.

Figure 17:
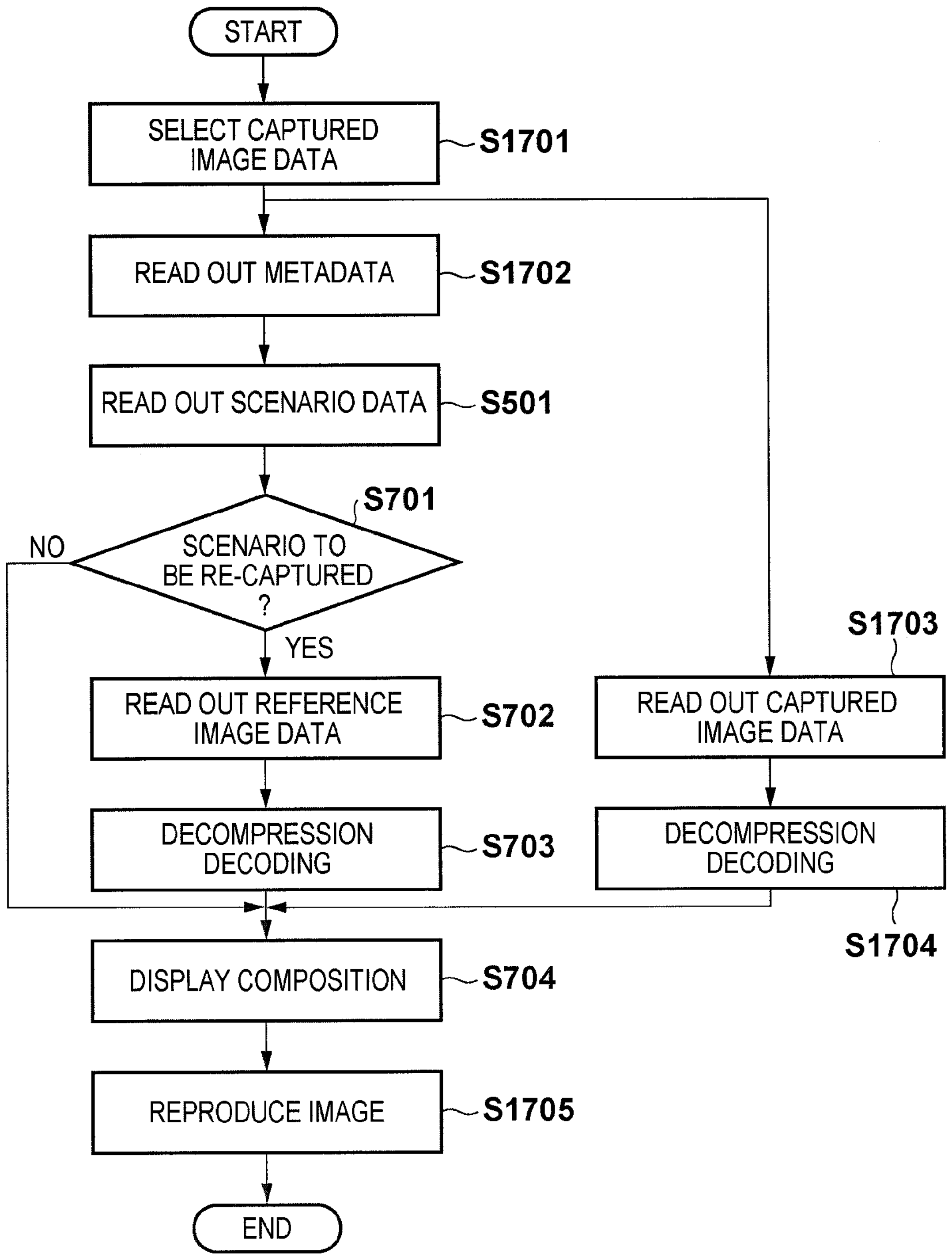
FIG. 17 is a flowchart showing processes from a captured image selection process until a reference image reproduction process.

FIG. 17 shows processes from a captured image selection process until a reference image reproduction process. Note that the processes shown in FIG. 17 are implemented when the system controller 317 of the image capturing apparatus 300 reads out a program from a memory, and executes the readout program.

Referring to FIG. 17, in step S1701, the system controller 317 selects a captured image recorded in the second recording area 209.

The system controller 317 reads out metadata of the selected image in step S1702, and simultaneously reads out the captured image data in step S1703.

In step S501, the system controller 317 reads out scenario data, which was referred to at the time of the image capturing operations, based on scenario identification numbers recorded in the readout metadata from the first recording area 208.

After that, the system controller 317 executes the same processes as those in steps S701 to S704 in FIG. 7. At the same time, the captured image data read out in step S1703 is decompression-decoded in step S1704.

In step S1705, the system controller 317 reproduces and displays the captured image data and reference image data in case of the second scenario data.

As described above, when an image captured with reference to the second .scenario data is to be reproduced, the reference image data included in the second scenario data is displayed, and the photographer can confirm compositions, performances, and the like at the time of capturing original images, thus improving the convenience upon confirmation of image capturing operations.

[Third Embodiment]

The third embodiment will be described hereinafter.

At an editing site, when captured images are edited, since an image, which was captured for a specific cut, is not a desired outcome, it cannot be used in editing, and is required to be re-captured in some cases. However, an image capturing site cannot recognize the reason why that cut was judged to be re-captured, and cannot often determine how to re-capture the cut to be re-captured.

In Japanese Patent Laid-Open No. 2004-187275 above, to cope with such situation, information required at the time of a re-capturing operation can be appended to scenario data, but images captured along a scenario are used intact at the image capturing site, resulting in a large data size to be handled.

In consideration of the above problem, this embodiment generates information which allows the photographer to easily recognize an image to be re-captured at the time of a re-capturing operation, and to execute an image capturing operation while confirming only images which are likely to be associated with the cut to be re-captured.

The third embodiment will exemplify a case in which images before and after the cut to be re-captured are recorded together with an image of that cut, which was judged to be re-captured upon editing.

Note that the arrangement of the PC 100 which implements the scenario editing apparatus 200 of this embodiment is as shown in FIG. 1. The ROM 102 contains an associated image specifying program, which records a cut number to be re-captured as scenario data to be re-captured, a time axis allocation program, which time-serially allocates a plurality of images, and a trimming program which trims some frames of an image, and records the trimmed image.

Figure 18:
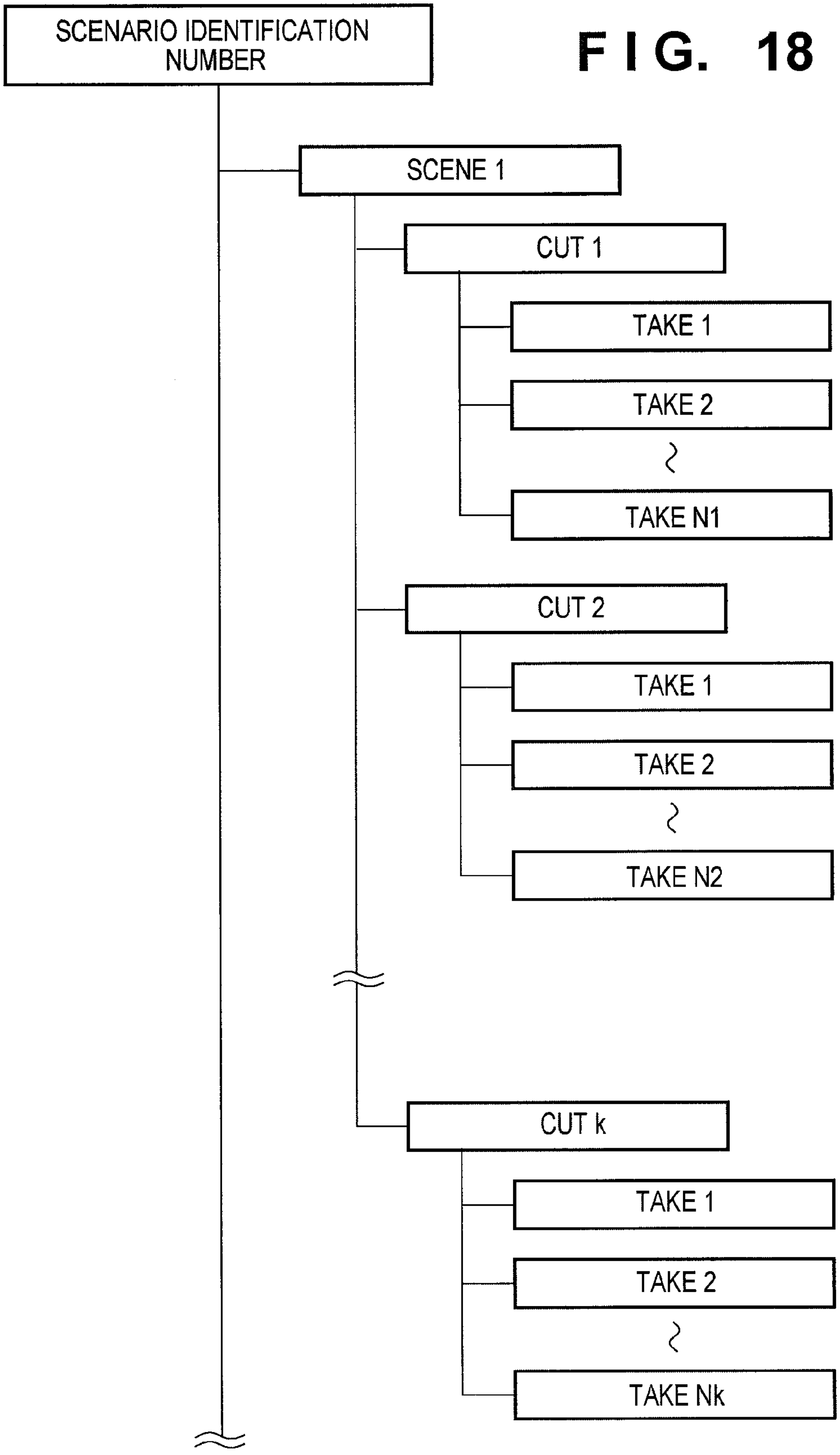
FIG. 18 is a view showing an example of scenario identification numbers of captured image data.

FIG. 18 exemplifies scenario identification numbers related to image data to be read out by the PC 100. "Scene" described in FIG. 18 indicates a segment of actions at a given place in the image capturing operation. Also, "cut" indicates images which are continuously recorded as a minimum unit of an image capturing operation.

In the scenario identification numbers, a cut number is recorded below a layer of each scene number in advance. A person who projects and makes up a movie or drama generates the scenario identification numbers as a scenario to be captured.

The photographer reads out the scenario identification numbers using the image capturing apparatus 300, and captures a plurality of cuts for each scene based on the readout scenario identification numbers.

Upon execution of actual image capturing operations, a plurality of image capturing operations (takes) are repeated until images can be successfully captured. For this reason, take numbers are additionally recorded below a layer of the cut number. In this case, recorded image data is associated with this take number to have one-to-one correspondence between them. The scenario identification numbers are recorded in the memory card (storage medium) 111 together with image data.

After the photographer has ended the image capturing operations, the editor inserts the data recorded memory card 111 into a memory slot of the PC 100, and edits the captured image data on the PC 100.

The editor allocates a plurality of recorded cuts along a time axis to generate image data. Then, the editor confirms the images while reproducing the generated image data. In this case, the editor designates images of a specific cut which configures the generated image data as a cut to be re-captured.

The PC 100 generates scenario data to be re-captured. The photographer reads out and confirms the scenario data to be re-captured using the image capturing apparatus 300, thus executing smooth re-capturing operations.

<Generation Processing of Scenario Data to be Re-Captured>

Processing for generating the aforementioned scenario data to be re-captured by the PC 100 will be described below with reference to FIG. 19. Assume that at the beginning of the processing shown in FIG. 19, the PC 100 has already been started up, and an image reproduction application stored in the ROM 102 has already been launched.

Figure 19:
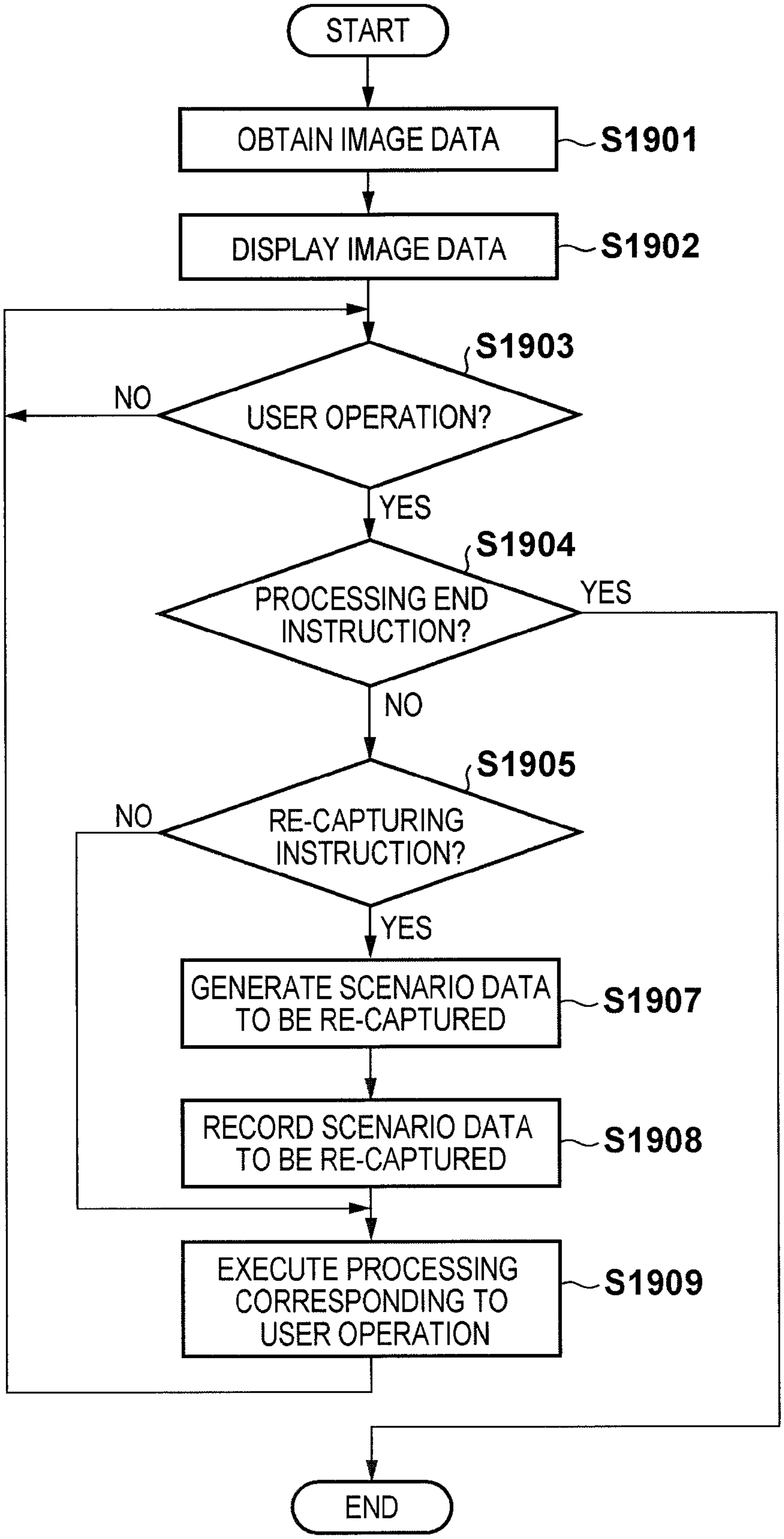
FIG. 19 is a flowchart showing processing for generating scenario data to be re-captured.

Referring to FIG. 19, in step S1901, when the memory card 111 is connected to the external I/F 105, the external I/F 105 detects that memory card 111, and notifies the CPU 101 of detection of the memory card 111. In response to this notification, the CPU 101 obtains image data from the memory card 111.

In step S1902, the CPU 101 displays the obtained image data via the image reproduction application.

Figure 20:
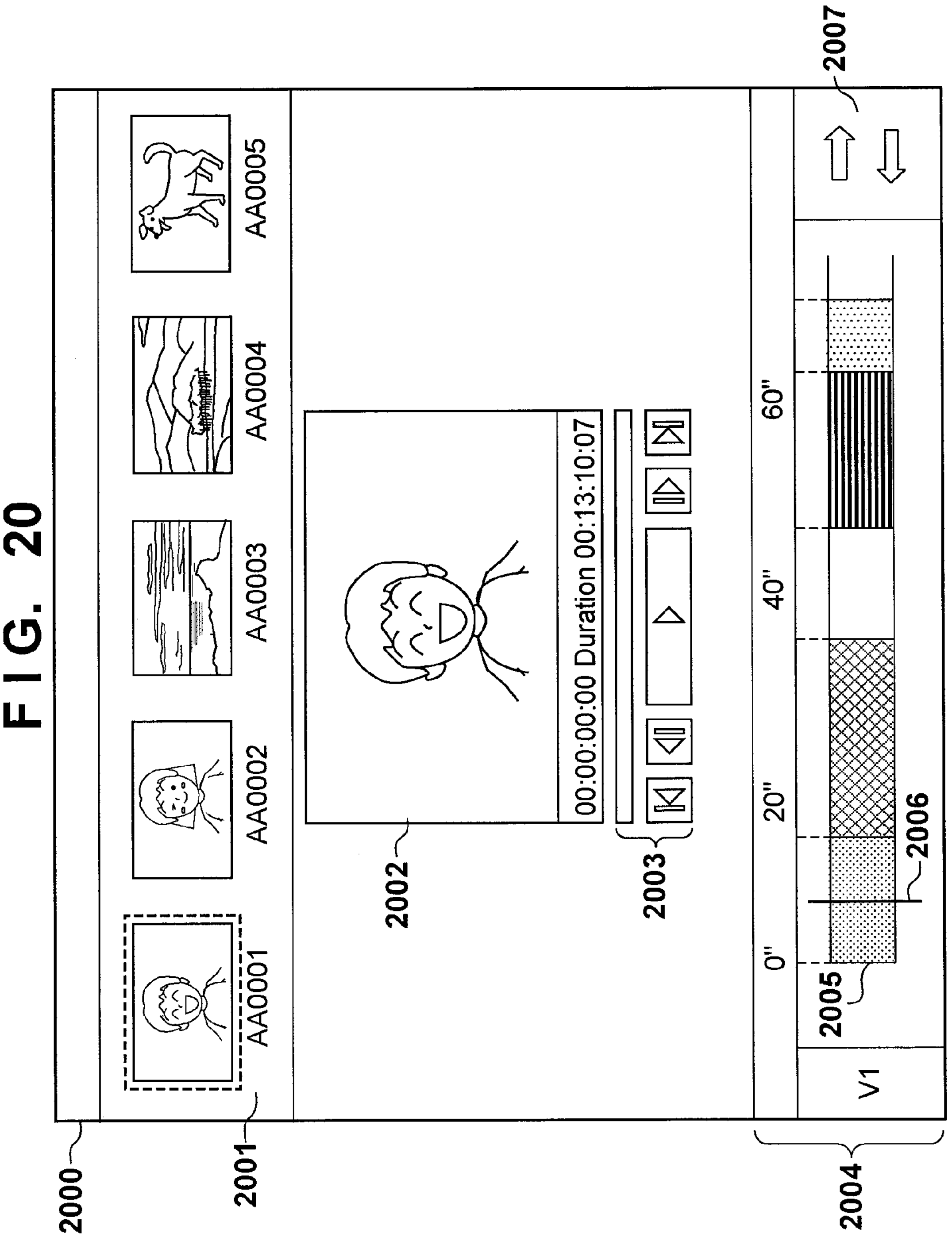
FIG. 20 shows a display example of an image reproduction screen.

FIG. 20 shows a screen display example of the image reproduction application.

Referring to FIG. 20, reference numeral 2000 denotes an operation screen of the image reproduction application. Reference numeral 2001 denotes an area for displaying thumbnails of the obtained image data. Reference numeral 2002 denotes an area for displaying reproduced image data. Reference numeral 2003 denotes control buttons for executing reproduction operations. Reference numeral 2004 denotes an area in which a plurality of recorded image data are allocated for respective cuts along a time axis.

The user selects image data corresponding to each cut displayed on the area 2001 as a thumbnail, and moves and allocates it on the time axis in the area 2004 (time axis allocation program). As a result, generated image data (V1) are indicated by rectangles 2005, and can be reproduced as one continuous image data. A frame position at the time of reproduction can be confirmed by the current position of a moving bar 2006. Reference numeral 2007 denotes control buttons for moving the position on the time axis.

Figure 21:
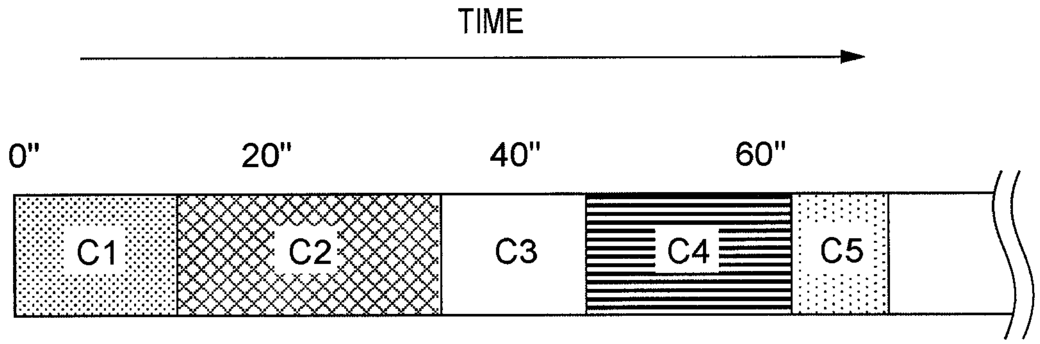
FIG. 21 is a view for explaining image data allocated on a time axis.

FIG. 21 shows some image data allocated on the time axis. A time unit is "sec".

In FIG. 21, reference numerals C1, C2, C3, C4, and C5 respectively denote image data corresponding to respective cuts. The image data, which are allocated in this way, can undergo sort processing, trimming processing for trimming some frames of an image, and the like.

Referring back to FIG. 19, the CPU 101 monitors in step S1903 whether or not a user operation on the application screen 2000 is detected. If a user operation is detected, the process advances to step S1904.

The CPU 101 determines in step S1904 whether or not an end instruction from the user is detected. If the end instruction is detected, the image reproduction application is quitted.

The CPU 101 determines in step S1905 whether or not the user operation is a re-capturing instruction.

For example, the user can select a cut (C1 to C5) to be re-captured for respective image data corresponding to the cuts shown in FIG. 21. If the user operation is an operation associated with selection of an image to be re-captured, the process advances to step S1907.

On the other hand, if the user operation is other than the operation associated with selection of an image to be re-captured, the process jumps to step S1909.

In step S1909, the CPU 101 executes processing corresponding to the user operation, and the process returns to the user operation monitoring processing in step S1903. The CPU 101 repeats steps S1903 to S1909 until an instruction to designate an image to be re-captured is detected as the user operation.

In step S1907, the CPU 101 generates scenario data to be recaptured. Details of this step will be described later.

In step S1908, the CPU 101 records the generated scenario data to be re-captured in the memory card 111.

The generation processing of the scenario data to be re-captured in step S1907 will be described below.

Let Cx be image data of a cut selected as an image to be re-captured of those allocated on the time axis. In this case, assume that image data corresponding to different cuts are allocated on the time axis like C1, C2, . . . , Cx−1, Cx, Cx+1, . . . in an allocation order on the time axis.

Figure 22:
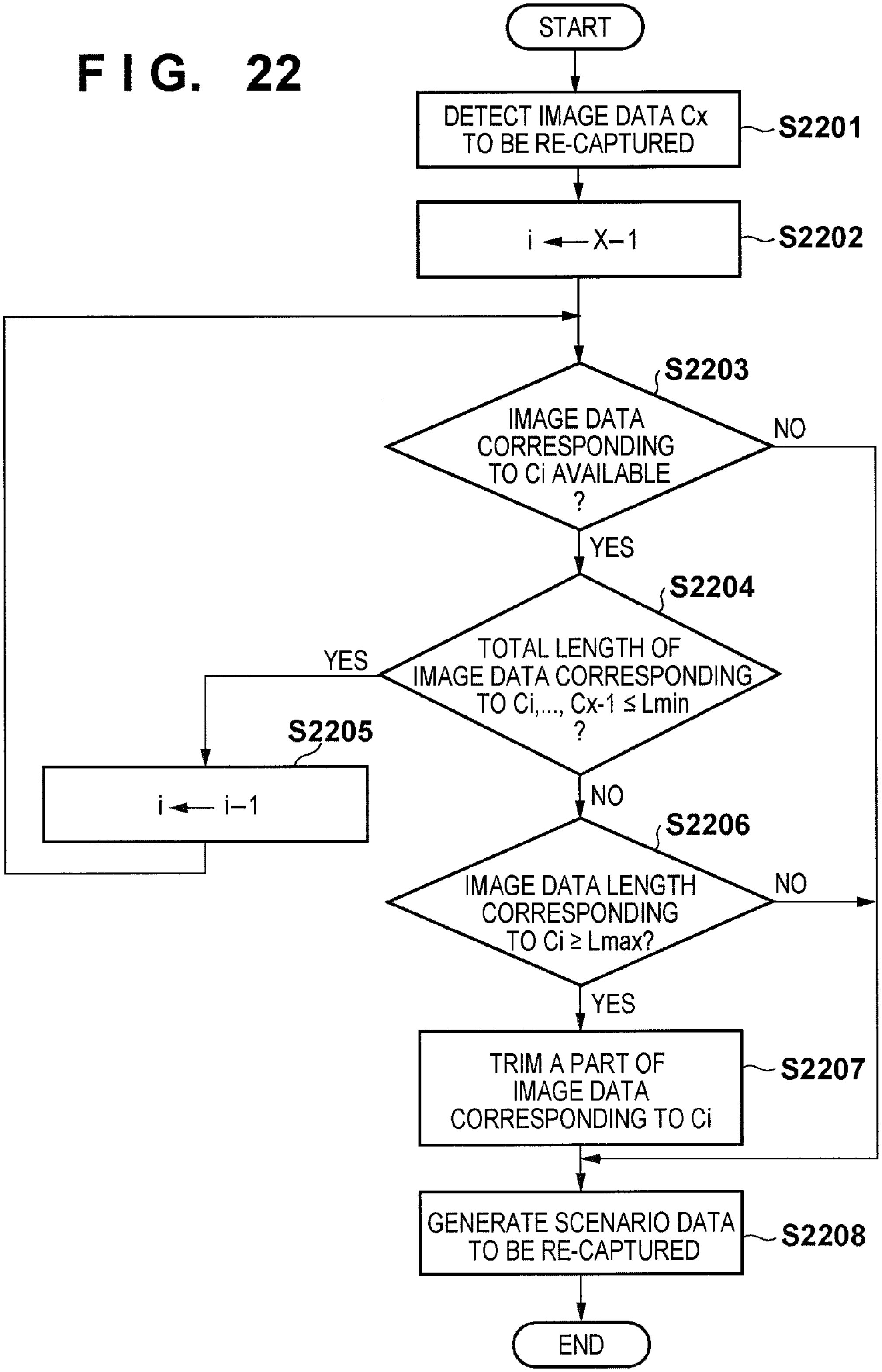
FIG. 22 is a flowchart showing generation processing of scenario data to be re-captured in step S1907 in FIG. 19.

FIG. 22 is a flowchart showing the generation processing of the scenario data to be re-captured in step 51907 in FIG. 19. An example in which image data designated as a cut to be re-captured and pieces of information of image data, which have high correlations with the contents of the designated image data, and are allocated before and after that image data, are recorded in association with each other will be described below. Note that processes in FIG. 22 are implemented when the CPU 101 of the PC 100 reads out the associated image specifying program and trimming program from the ROM 102 and executes the readout programs.

Referring to FIG. 22, in step S2201, the CPU 101 executes the associated image specifying program to detect the designated cut Cx to be re-captured.

In step S2202, the CPU 101 sets a number (x−1) indicating image data allocated before the designated image data to be re-captured on the time axis in a variable i for managing image data to be processed.

The CPU 101 detects in step S2203 whether or not image data corresponding to a cut Ci is available on the time axis. If no image data is available, this indicates that no image data is allocated before the designated cut to be re-captured. In this case, the process jumps to step S2208. On the other hand, if image data corresponding to the cut Ci is available on the time axis, the process advances to step S2204.

In step S2204, the CPU 101 obtains a length of the image data of the cut Ci from a take number, and determines whether or not that length is equal to or smaller than a minimum image data length (Lmin). This Lmin is a minimum required length which allows the photographer to easily recognize the contents of image data when he or she reproduces that image data, and the user sets this value in advance. If the image data length of the cut Ci is equal to or smaller than Lmin, the CPU 101 decrements the value of the variable i in step S2205, and sets image data allocated further before the image data of the cut Ci as image data to be processed.

The processes in steps S2203 to S2205 are repeated until the total image data length of cuts Ci, . . . , Cx−1 exceeds Lmin.

The CPU 101 determines in step S2206 whether or not the length of the image data to be processed is equal to or larger than a maximum image data length (Lmax). This Lmax is a length which limits an image size to be recorded as the scenario data to be re-captured, and the user sets this value in advance. If the length of the image data Ci to be processed is equal to or larger than Lmax, the process advances to step S2207.

In step S2207, the CPU 101 executes the trimming program to trim frames in a range which falls outside the length Lmax of the image data Ci from the image data.

In step S2208, the CPU 101 generates the scenario data to be re-captured based on the aforementioned processing result.

In the scenario data to be re-captured, pieces of information of a scene ID, cut ID, and take ID and time codes at the start and end timings of each image data are recorded in correspondence with each of the image data Ci to Cx.

In FIG. 22, a cut, which is allocated before the designated image data to be re-captured on the time axis of image data allocated on the time axis, is recorded in the scenario data to be re-captured. However, in practice, image data, which is allocated after the designated image data to be re-captured on the time axis, undergoes the same processes, and is recorded in the scenario data to be re-captured. In FIG. 22, a description of this processing is not given.

In association with the scenario data to be re-captured, which is specifically generated by the aforementioned processes, an example in which image data corresponding to a specific cut is designated as image data to be re-captured for image data, which are allocated on the time axis, as shown in, for example, FIGS. 23A and 23B will be described below.

Figure 23A:
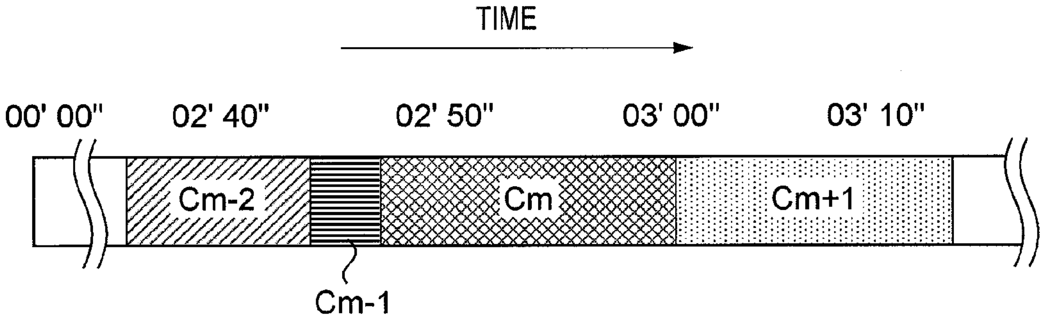
FIGS. 23A and 23B are two different designation examples of image data to be re-captured from image data allocated on the time axis.
Figure 23B:
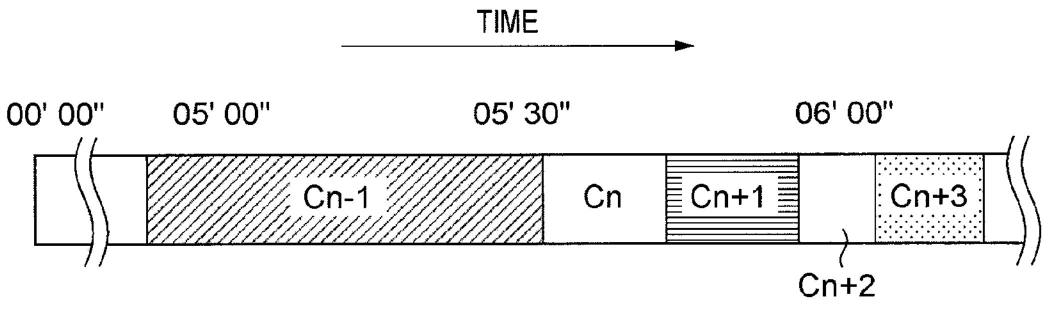

FIGS. 23A and 23B show the following two different cases.

(A) When image data Cm−1 allocated before designated image data Cm to be re-captured is shorter than the minimum image data length (Lmin=10 sec)

(B) When image data Cn−1 allocated before designated image data Cn to be re-captured is longer than the maximum image data length (Lmax=20 sec)

FIGS. 24A and 24B respectively show scenario data to be re-captured, which are generated as a result of execution of the processes in steps S2201 to S2208 for the above two different cases.

In FIG. 24A, the image data length of the image data Cm−1 allocated immediately before the designated image data Cm to be re-captured is 2 sec, and is smaller than Lmin. For this reason, image data Cm−2, which is allocated further before the data Cm−1, is also recorded in the scenario data to be re-captured. The total image data length of the image data Cm−1 and Cm−2 is 11 sec (=9+2), and is larger than Lmin.

In FIG. 24B, the image data length of the image data Cn−1, which is allocated immediately before the designated image data Cn to be re-captured, is 40 sec, and is larger than Lmax. For this reason, frames for Lmax (sec) are trimmed from the end of this image data Cn−1, and the image data after trimming is recorded in the scenario data to be re-captured.

Furthermore, in both FIGS. 24A and 24B, image data Cm+1 and Cn+1 allocated after the designated image data Cm and Cn to be re-captured are respectively recorded in the scenario data to be re-captured.

The CPU 101 records the generated scenario data to be re-captured in the memory card 111 in association with the corresponding actual image data.

The photographer reads out the generated scenario data to be re-captured using the image capturing apparatus 300, so as to actually reproduce and confirm images of associated cuts as well as an image of a cut to be re-captured. Thus, the photographer can recognize the sequence of cuts in terms of editing, thus executing the re-capturing operation more accurately.

The editor may add processing for recording detailed information of request contents at the time of re-capturing operations and the like to scenario identification numbers upon designation of an image to be re-captured. Then, the photographer can confirm the scenario identification numbers together with the image, thus executing the re-capturing operation more accurately.

[Fourth Embodiment]

The fourth embodiment will be described hereinafter. The third embodiment has exemplified the case in which scenario data to be re-captured is generated based on image data allocated on the time axis. By contrast, the fourth embodiment will exemplify a case in which scenario data to be re-captured is generated when an image corresponding to a specific cut is designated as an image to be re-captured while image data are not allocated on the time axis. The internal arrangement of the PC 100 in the fourth embodiment is the same as that described in the third embodiment.

As in the third embodiment, the editor inserts the memory card (including scenario identification numbers and image data) 111 after image capturing operations into a memory slot of the PC 100, and launches the image reproduction application. At this time, the operation of the image reproduction application follows the flowchart shown in FIG. 19.

A generation method of scenario data to be re-captured when the editor directly designates image data to be re-captured without allocating any image data on the time axis in this situation will be described below.

Figure 25:
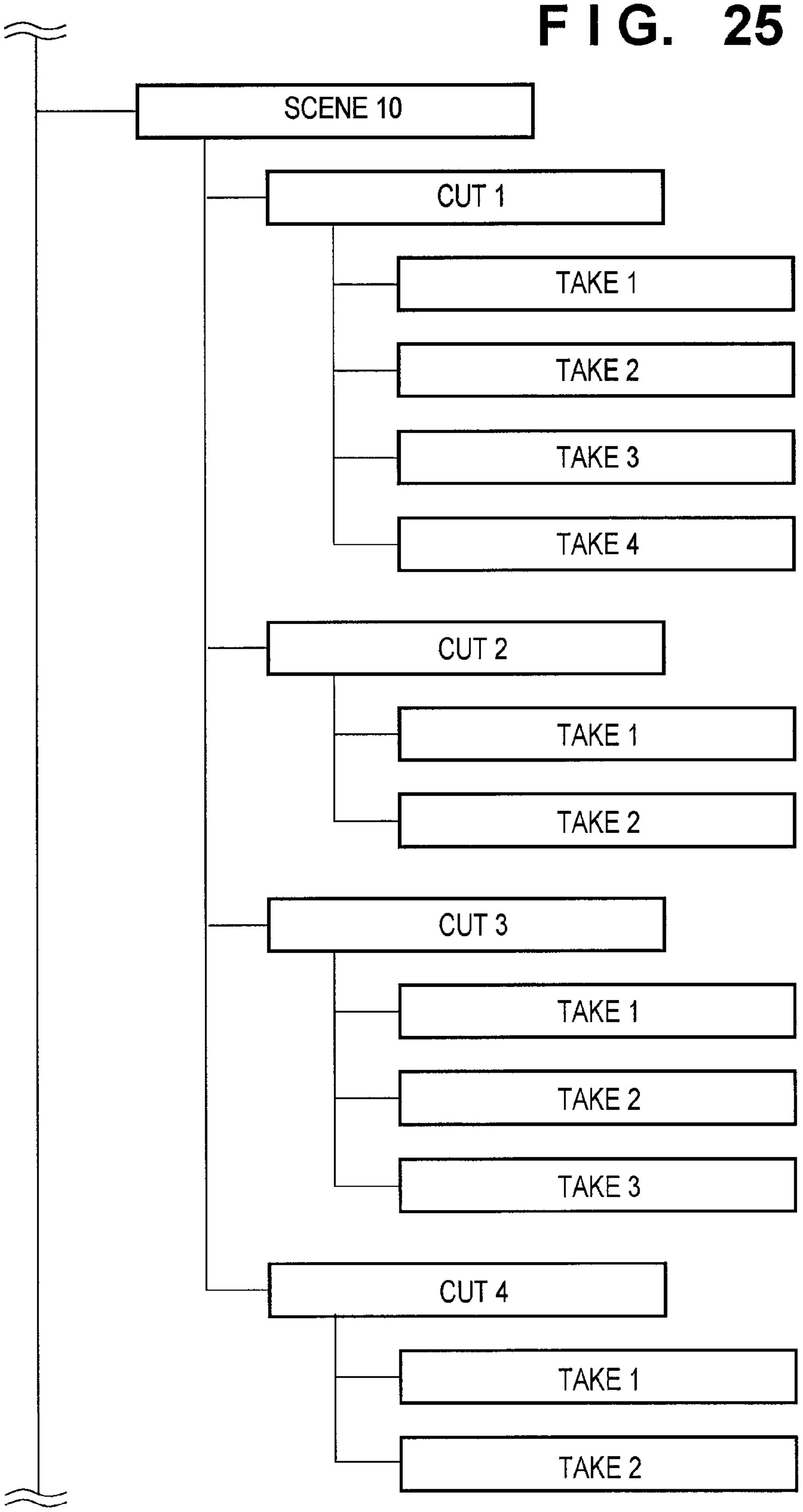
FIG. 25 shows examples of scenario identification numbers after completion of a re-capturing operation.

FIG. 25 exemplifies scenario identification numbers after completion of image capturing operations in practice.

In this case, as an image capturing scenario, four cuts (cuts 1 to 4) are set in a scene 10, and a plurality of takes are captured in each cut in actual image capturing operations. Described numerals correspond to respective scene, cut, and take IDs.

For example, assume that the editor designates the cut 2 as a cut to be re-captured. At this time, the associated image specifying program generates scenario data to be re-captured for the cut to be re-captured according to the flowchart shown in FIG. 22.

However, when image data are allocated on the time axis in the third embodiment, image data C1, C2, . . . , Cx−1, Cx, Cx+1, . . . are allocated according to their order on the time axis. However, in this case, image data C1, C2, . . . , Cx−1, Cx, Cx+1, . . . are associated in the order of cuts recorded in the same scene in the scenario identification numbers.

In steps S2204, S2206, S2207, and S2208, image data corresponding to a take having the latest date and time of generation (having the largest ID value) in a single cut is selected as image data to be processed. This is because image capturing operations for one cut are repeated until they succeed, and image data of a cut can be used as reference data of the scenario data to be re-captured more helpful as its date and time of generation is newer.

FIG. 26 shows scenario data to be re-captured, which is generated by the PC 100 with the aforementioned processing.

Image data information of the take 2 in the designated cut 2 to be re-captured and image data corresponding to a take 4 in the cut 1 and that corresponding to a take 3 in the cut 3 as surrounding cuts of the cut 2 are recorded as the scenario data to be re-captured. The CPU 101 records the scenario data to be re-captured, which is generated as described above, in the memory card 111 in association with actual image data.

The photographer reads out the generated scenario data to be re-captured using the image capturing apparatus, so as to actually reproduce and confirm images of associated cuts as well as an image of a cut to be re-captured.

Then, even when a specific cut is designated as a cut to be re-captured in a state in which image data are not allocated on the time axis, the photographer can accurately execute re-capturing operations while confirming images of surrounding reference cuts.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-059654, filed Mar. 17, 2011, which is hereby incorporated by reference herein in its entirety.

What is claimed is:

1. A scenario editing apparatus which generates and edits scenario data to be referred to when an image capturing apparatus captures images, comprising:

a first recording unit configured to record first scenario data appended with identification numbers for respective captured contents in a recording medium;

a read-out unit configured to read out image data captured with reference to the first scenario data and identification numbers for the respective captured contents, which are associated with the captured image data, from the recording medium;

a selection unit configured to select image data, which is to be instructed to be re-captured, from the captured image data read out by said read-out unit;

a generation unit configured to generate second scenario data for re-capturing image data corresponding to image data selected by the selection unit; and a second recording unit configured to record the second scenario data generated by said generation unit in the recording medium, wherein the second scenario data is appended with an identification number of the first scenario data, which was referred to when the captured image data were captured, and take numbers for indentifying a plurality of image capturing operations for the same identification number.

2. The apparatus according to claim 1, wherein the second scenario data is appended with number information used for inheriting the take numbers for identifying the plurality of image capturing operations corresponding to the same identification number.

3. The apparatus according to claim 1, wherein the second scenario data includes image capturing instruction information displayed when the image data selected by said selection unit is re-captured.

4. The apparatus according to claim 3, wherein the second scenario data is appended with reference image data generated from the captured image data.

5. An image capturing apparatus which captures images with reference to scenario data appended with identification numbers for respective captured contents, comprising:

an image capturing unit configured to capture images with reference to scenario data recorded in a first recording area of a recording medium;

a recording unit configured to record the image data captured with reference to the scenario data and the identification numbers for the respective captured contents associated with the captured image data in a second recording area of the recording medium in association with each other;

a display unit configured to display images related to the captured image data and information related to the scenario data; and a determination unit configured to determine whether or not the scenario data is scenario data to be re-captured, wherein when said determination unit determines that the scenario data is scenario data to be re-captured, said display unit displays a reference image for a re-capturing operation, which image is generated from the captured image data, together with the images related to the captured image data, wherein said display unit has an image capturing mode for displaying images related to image data generated by said image capturing unit, and when said determination unit determines that the scenario data is the scenario data to be re-captured, said display unit displays the reference image to be superimposed on a display of the image capturing mode.

6. The apparatus according to claim 5, wherein said display unit has a scenario view mode for displaying scenario data recorded in the recording medium as a list, when said determination unit determines that the scenario data is the scenario data to be re-captured, said display unit switches a display of the scenario view mode to a display of the reference image, and when the display of the reference image ends, said display unit returns to the display of the scenario view mode.

7. The apparatus according to claim 5, wherein said display unit has an image capturing mode for displaying images related to image data generated by said image capturing unit, and a scenario view mode for displaying scenario data recorded in the recording medium as a list, when said determination unit determines that the scenario data is the scenario data to be re-captured, said display unit switches a display of the scenario view mode to a display of the reference image, and when the display of the reference image ends, said display unit switches to a display of the image capturing mode.

8. The apparatus according to claim 5, wherein when the scenario data to be re-captured includes image capturing instruction information associated with a re-capturing operation of the captured image data, whether or not to display the image capturing instruction information is allowed to be switched.

9. A scenario editing method for an apparatus which generates and edits scenario data to be referred to when an image capturing apparatus captures images, the method comprising:

a first recording step of recording first scenario data appended with identification numbers for respective captured contents in a recording medium;

a read out step of reading out image data captured with reference, to the first scenario data and identification numbers for the respective captured contents, which are associated with the captured image data, from the recording medium;

a selection step of selecting image data, which is to be instructed to be re-captured, from the captured image data read out in the read-out step;

a generation step of generating second scenario data for re-capturing image data corresponding to image data selected in the selection step; and a second recording step of recording the second scenario data generated in the generation step in the recording medium, wherein the second scenario data is appended with an identification number of the first scenario data, which was referred to when the captured image data were captured, and take numbers for identifying a plurality of image capturing operations for the same identification number.

10. A control method for an image capturing apparatus which captures images with reference to scenario data appended with identification numbers for respective captured contents, the method comprising:

an image capturing step of capturing image with reference to scenario data recorded in a first recording area of a recording medium;

a recording step of recording the image data captured with reference to the scenario data and the identification numbers for the respective captured contents associated with the captured image data in a second recording area of the recording medium in association with each other;

a display step of displaying, on a display unit, images related to the captured image data and information related to the scenario data; and a determination step of determining whether or not the scenario data is scenario data to be re-captured, wherein when it is determined in the determination step that the scenario data is scenario data to he re-captured, a reference image for a re-capturing operation, which image is generated from the captured image data, is displayed in the display step together with the images related to the captured image data, wherein the display unit has an image capturing mode for displaying images related to image data generated in said image capturing step, and when in the determination unit step, the scenario data is determined to be the scenario data to be re-captured, the displays step displays the reference image to be superimposed on a display of the image capturing mode.

* * * * *